(12) United States Patent
Dietrich

(10) Patent No.: US 12,304,236 B2
(45) Date of Patent: *May 20, 2025

(54) BICYCLE HUB AND SPOKE ARRANGEMENT

(71) Applicant: Rolf Dietrich, Toledo, OH (US)

(72) Inventor: Rolf Dietrich, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,256

(22) Filed: Oct. 28, 2024

(65) Prior Publication Data

US 2025/0050680 A1 Feb. 13, 2025

Related U.S. Application Data

(63) Continuation-in-part of application No. 18/410,295, filed on Jan. 11, 2024, now Pat. No. 12,128,705, which is a continuation of application No. 18/330,148, filed on Jun. 6, 2023, now Pat. No. 11,904,630.

(51) Int. Cl.
*B60B 1/04* (2006.01)
*B60B 1/00* (2006.01)

(52) U.S. Cl.
CPC .............. *B60B 1/042* (2013.01); *B60B 1/003* (2013.01); *B60B 1/041* (2013.01)

(58) Field of Classification Search
CPC ........... B60B 1/042; B60B 1/041; B60B 1/04; B60B 1/003; B60B 1/02; B60B 1/0207; B60B 1/0215; B60B 1/0223; B60B 1/023; B60B 1/0238
See application file for complete search history.

(56) References Cited

U.S. PATENT DOCUMENTS

| | | |
|---|---|---|
| 380,358 A | 4/1888 | Smith et al. |
| 452,046 A | 5/1891 | Mather |
| 705,121 A | 7/1902 | Newton |
| 918,118 A | 4/1909 | Blean |
| 1,184,852 A * | 5/1916 | Hawkinson ............. B60B 1/042 301/84 |

(Continued)

FOREIGN PATENT DOCUMENTS

JP S56154301 A 11/1981

OTHER PUBLICATIONS

Jobst Brandt, The Bicycle Wheel, 1993, Avocet, 3rd Edition, pp. 66-70. (Year: 1993).*

*Primary Examiner* — Jason R Bellinger
(74) *Attorney, Agent, or Firm* — Jacob M. Ward; Ward Law Office LLC

(57) ABSTRACT

A bicycle hub and spoke arrangement is provided. The arrangement includes flanges extending radially from a hub shaft. The flanges include apertures. The first end of each of a plurality of spokes engages with one of the apertures. A second end of the spokes is connected to an outer rim. Three areas of contact are created between the first end of the spokes and the associated flange. A first area of contact is formed as a head of each of the spokes is seated within one of the apertures. A second area of contact is formed as an inner radius segment of each spoke contacts a wall defining the one of the apertures and a third area of contact is formed as each of the spokes contacts an outer rim of the flange. The total quantity of spokes can be either 6, 8, 9, 10, 12, 15, 16 or 18.

18 Claims, 24 Drawing Sheets

(56) References Cited

U.S. PATENT DOCUMENTS

| | | | |
|---|---|---|---|
| 1,419,162 A * | 6/1922 | Martin | B60B 1/042 |
| | | | 301/74 |
| 1,558,126 A | 10/1925 | Stoler | |
| 1,216,474 A | 2/1971 | Lindsay | |
| 4,300,804 A * | 11/1981 | Hasebe | B60B 27/023 |
| | | | 301/110.5 |
| 5,350,221 A | 9/1994 | Pearce et al. | |
| 5,769,584 A * | 6/1998 | Claes | B60B 1/041 |
| | | | 301/58 |
| 5,779,323 A * | 7/1998 | Burrows | B60B 1/0246 |
| | | | 301/58 |
| 6,234,580 B1 * | 5/2001 | Muraoka | B60B 21/066 |
| | | | 301/58 |
| 6,382,734 B1 * | 5/2002 | Passarotto | B60B 1/041 |
| | | | 301/59 |
| 6,568,767 B2 * | 5/2003 | Meggiolan | B60B 1/042 |
| | | | 301/110.5 |
| 7,331,638 B2 * | 2/2008 | Passarotto | B60B 1/0223 |
| | | | 301/58 |
| 7,562,940 B2 * | 7/2009 | D'Aluisio | B60B 27/026 |
| | | | 301/59 |
| 7,651,172 B2 * | 1/2010 | Meggiolan | B60B 1/023 |
| | | | 301/59 |
| 9,428,006 B2 * | 8/2016 | Martin | B60B 5/02 |
| 10,525,765 B2 * | 1/2020 | Chang | B60B 1/042 |
| 11,904,630 B1 * | 2/2024 | Dietrich | B60B 1/041 |
| 12,128,705 B1 * | 10/2024 | Dietrich | B60B 1/041 |
| 2002/0074853 A1 * | 6/2002 | Krampera | B60B 1/0207 |
| | | | 301/55 |
| 2006/0103231 A1 * | 5/2006 | Fioravantil | B60B 21/062 |
| | | | 301/55 |
| 2008/0054712 A1 * | 3/2008 | Urbani | B60B 21/025 |
| | | | 301/58 |

\* cited by examiner

BICYCLE HUB AND SPOKE ARRANGEMENT

CROSS REFERENCE TO RELATED APPLICATIONS

This application claims the benefit of pending U.S. Utility patent application Ser. No. 18/410,295 filed on Jan. 11, 2024, which issued as U.S. Pat. No. 12,128,705, which claimed the benefit of U.S. Utility patent application Ser. No. 18/330,148, filed on Jun. 6, 2023, which issued as U.S. Pat. No. 11,904,630 on Feb. 20, 2024. The entire disclosures of the above applications and issued patent are incorporated herein by reference.

FIELD

The present disclosure relates generally to bicycle wheels and, more particularly, to a novel bicycle hub and spoke arrangement configured to provide increased resistance to the breakage of the spokes due to vibration and load cycling during wheel rotation under load.

INTRODUCTION

This section provides background information related to the present disclosure which is not necessarily prior art.

Conventional bicycles are well known as having two wheels supported for rotation by a frame. Typically, the wheels are arranged with one behind the other. The frame includes handlebars for steering, a seat and opposing pedals. The opposing pedals are connected by a chain to the rear most wheel. When the rider pushes on the pedals, the chain moves thereby causing the rear most wheel to turn.

The bicycle stays upright while moving forward by being steered so as to keep its center of mass over the wheels. The rider usually provides the steering.

It is known for the wheels to be formed with a hub and spoke arrangement. In this arrangement, a plurality of spokes connect to opposing flanges of the hub and extend radially and connect to a common outer rim. The spokes are tensioned and configured to hold the hub and transfer the weight of the rider and the bicycle to the wheel. In doing so, the plurality of spokes provide stiffness in the wheel making the wheel more efficient when spinning.

In certain instances, it is known that spokes can fail. There are many causes of spoke failure including the non-limiting examples of uneven tension, stress incurred during hard riding, mixing different types of spokes, impact from potholes, worn and/or aged spokes, load cycling during wheel rotation under load, excess weight of rider and/or bicycle, types of spoke materials and the like.

In other instances, it is known that spokes can fail due to the phenomenon known as "shimmy." Simply, bicycle shimmy can be caused by the left to right and right to left pull of the spokes and the resulting vibration caused therein.

It would be advantageous if the hub and spoke arrangements of bicycles could be improved to better address spoke failure and shimmy.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the bicycle hub and spoke arrangement.

The above objects as well as other objects not specifically enumerated are achieved by a novel bicycle hub and spoke arrangement. The novel bicycle hub and spoke arrangement includes a bicycle axle supported for rotation by a hub shaft. The bicycle axle is configured to support a bicycle wheel for rotation. A plurality of flanges extends radially from the hub shaft. Each of the plurality of flanges has a plurality of circumferentially arranged apertures. A plurality of spokes each have a first end, an opposing second end and a body extending therebetween. The first end of each of the plurality of spokes is engaged with one of the circumferentially arranged apertures. The second end of each of the plurality of spokes is connected to an outer rim. The outer rim is configured to support a tire. The first end of each of the plurality of spokes is connected to one of the plurality of circumferentially oriented apertures of the plurality of flanges in a manner such as to create three areas of contact between the first end of each of the plurality of spokes and the associated flange. The three areas of contact are configured to strengthen a J bend area of the spoke and address spoke failure and shimmy. A first area of contact is formed as a head of each of the spokes is seated within one of the plurality of circumferentially arranged apertures. A second area of contact is formed as an inner radius segment of each of the spokes contacts a wall defining the one of the plurality of flange apertures and a third area of contact is formed as each of the spokes contacts an outer rim of the flange. The total quantity of spokes can be either 6, 8, 9, 10, 12, 15, 16 or 18.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
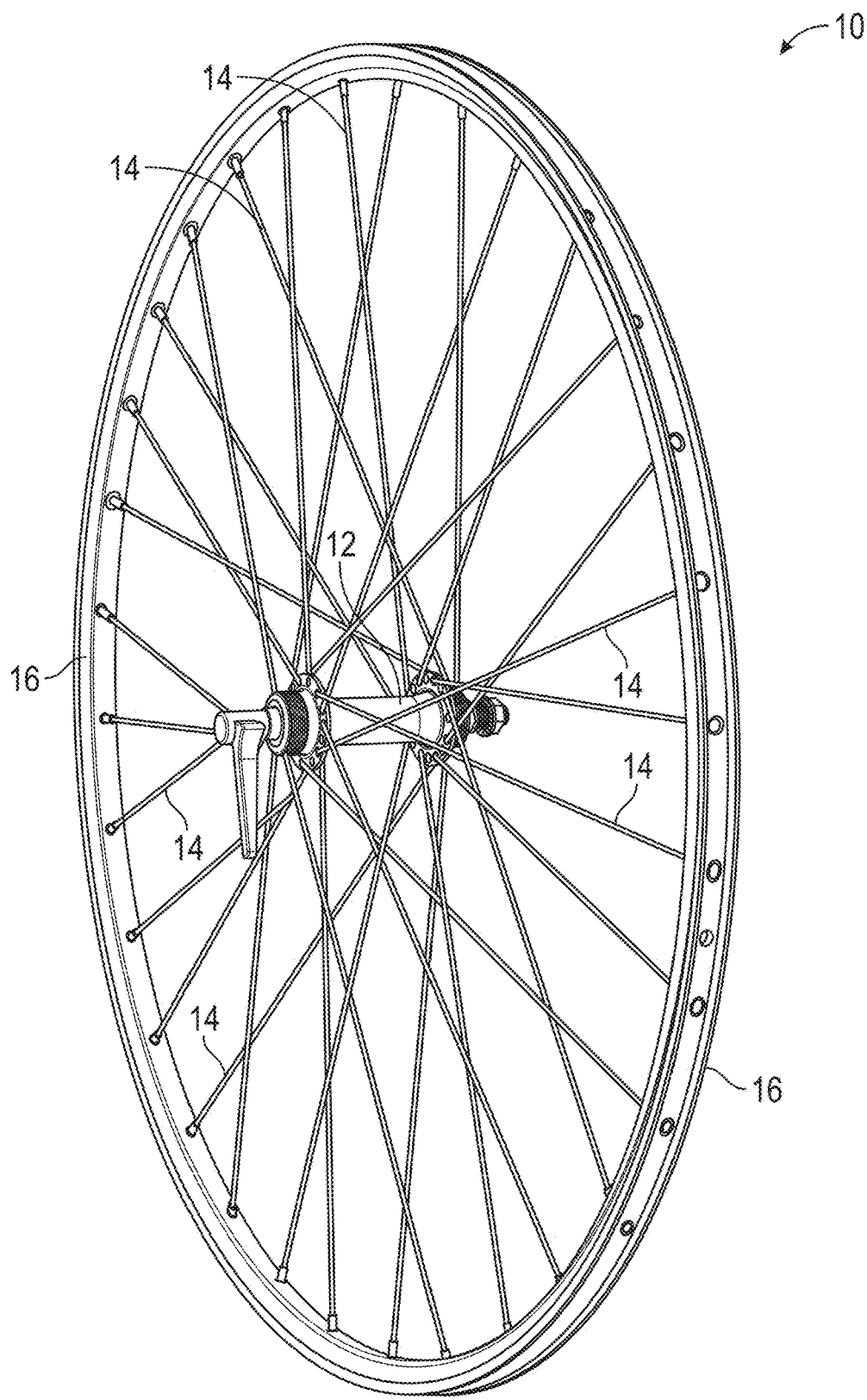
FIG. 1 is a perspective view of a conventional bicycle wheel.

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The description and figures disclose a novel bicycle hub and spoke arrangement (hereafter "hub and spoke arrangement"). Generally, the novel hub and spoke arrangement provides three areas of contact between portions of a spoke and a flange extending from the hub. The first area of contact is between a head of the spoke and the flange. The second area of contact occurs between an arcuate inner radius segment of the spoke commonly referred to as the "J" bend area and the flange. The third area of contact occurs between an extension segment of the spoke (downstream from the J bend area) and another area of the flange. It is believed the three areas of contact arrangement between the flanges of the hub and each of the spokes advantageously provides increased resistance to the breakage of the spokes at the J bend area due to vibration and load cycling during wheel rotation under load and also address shimmy.

Referring now to FIG. 1, a bicycle wheel is illustrated generally at 10. The bicycle wheel 10 is conventional in the art and will only be briefly described herein. The bicycle wheel 10 is configured for rotational support by a frame (not shown) and includes a conventional hub 12, a plurality of spokes 14 and a circumferential outer rim 16.

Figure 2:
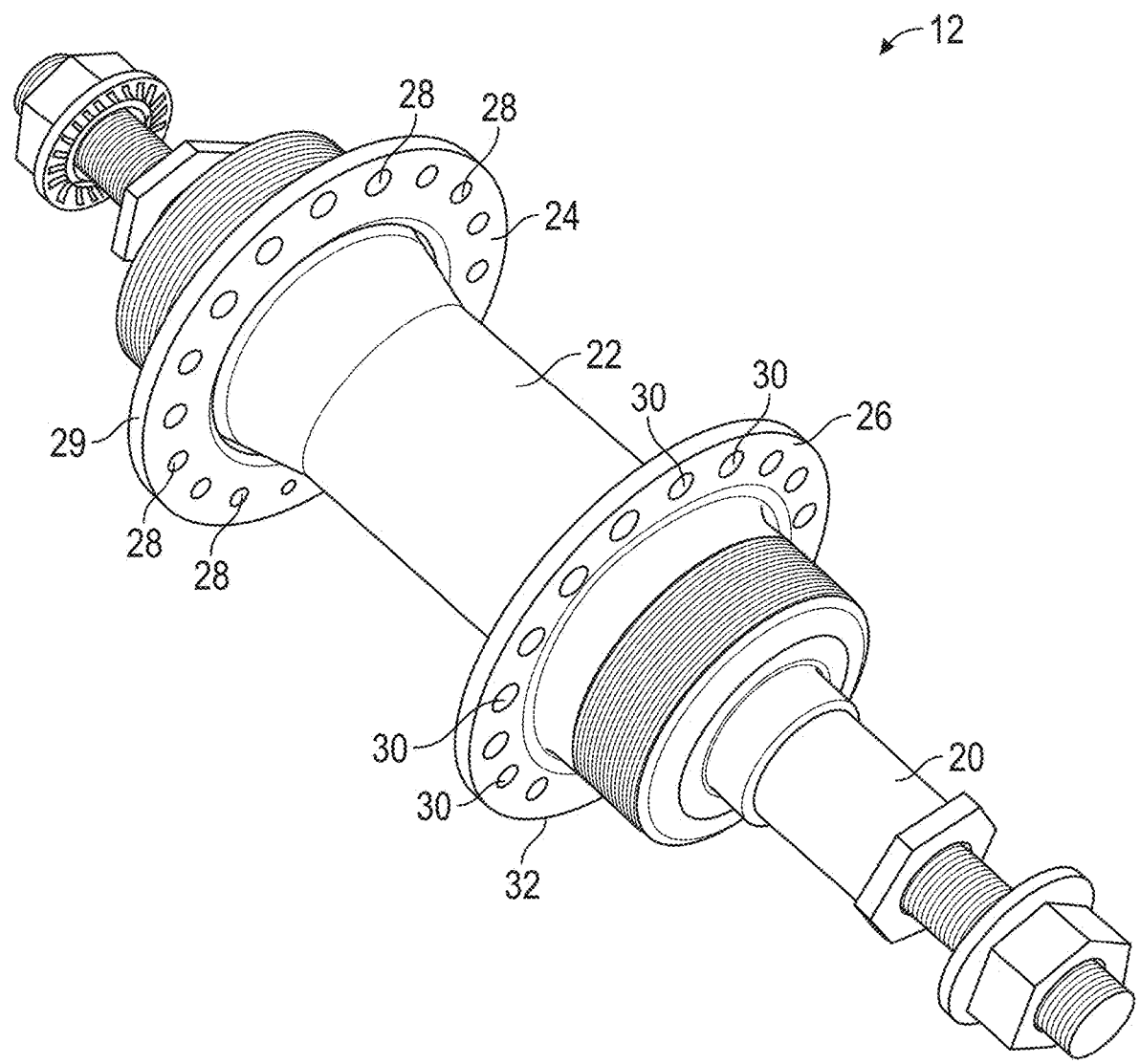
FIG. 2 is a perspective view of a hub of the conventional bicycle wheel of FIG. 1.

Referring now to FIG. 2, the conventional hub 12 includes an axle 20 supported for rotation within a hub shaft 22. Opposing first and second flanges 24, 26 extend radially from the hub shaft 22. The first flange 24 includes a plurality of first flange apertures 28 arranged in a circumferential pattern adjacent an outer perimeter 29 of the first flange 24. In a similar manner, the second flange 26 includes a plurality of second flange apertures 30 arranged in a circumferential pattern adjacent an outer perimeter 32 of the second flange 26. Each of the plurality of first and second flange apertures 28, 30 has a circular cross-sectional shape. As will be discussed in more detail below, each of the plurality of first and second flange apertures 28, 30 is configured to receive a portion of a spoke therethrough and further configured to seat a head of a spoke (reference FIG. 5).

Figures 3A, 3B:
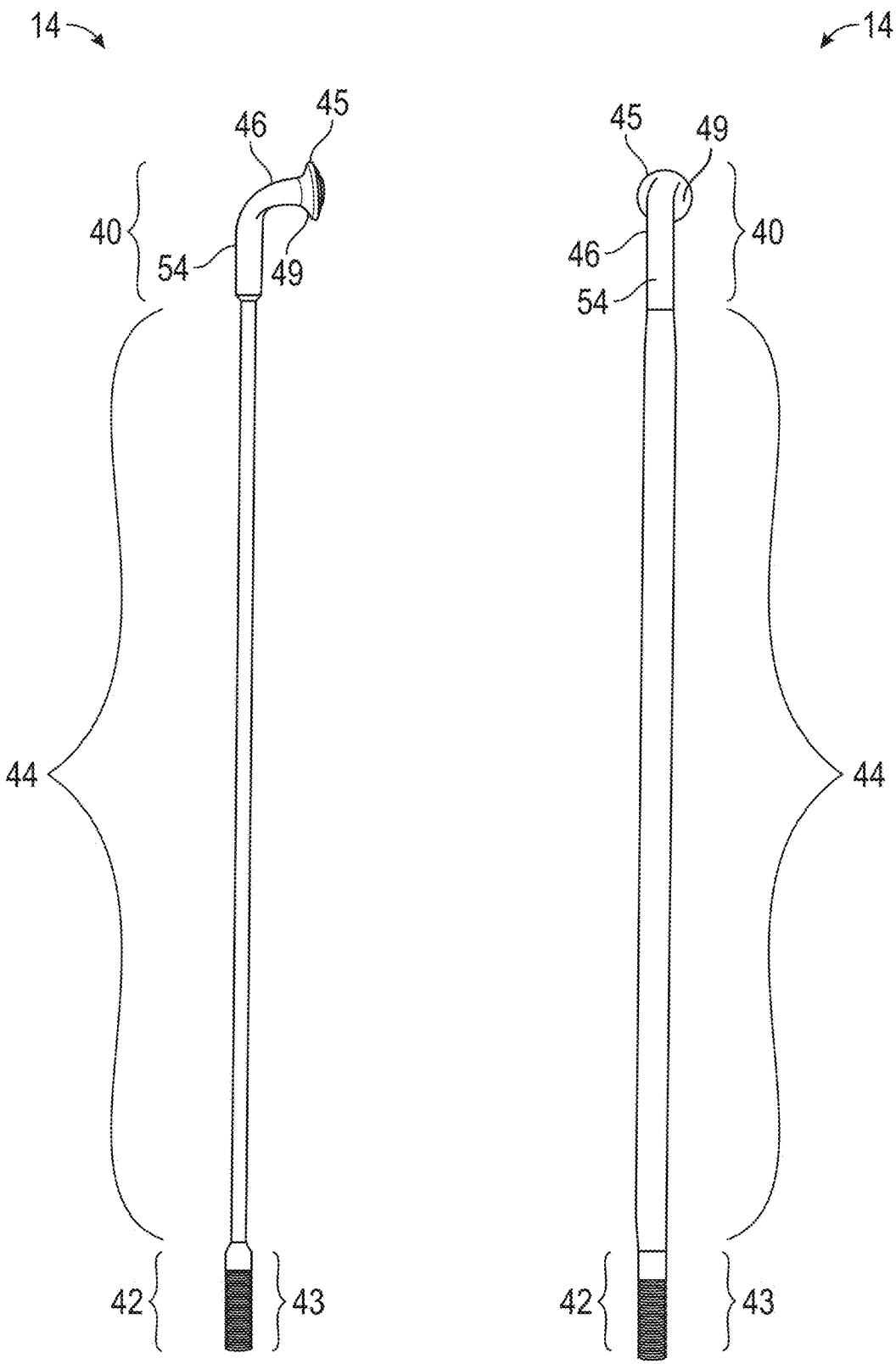
FIG. 3A is a perspective side view of a conventional spoke of the conventional bicycle wheel of FIG. 1.
FIG. 3B is a perspective front view of the conventional spoke of FIG. 3A.

Referring now to FIGS. 3A and 3B, a conventional spoke 14 is illustrated. The spoke 14 includes a first end 40, an opposing second end 42 and a body 44 extending therebetween. The first end 40 includes a head 45, a bent section 46 (commonly called a J bend section), and an extension segment 54. The head 45 includes a tapered portion 49 that connects to the J bend section 46.

Referring again to FIGS. 3A and 3B, the second end 42 of the spoke 14 includes a threaded portion 43. The threaded portion 43 is configured for insertion into apertures in the outer rim 16 (FIG. 1) and further configured to receive a threaded member (not shown) in a manner such as to secure the second end 42 of the spoke 14 to the outer rim 16 (FIG. 1).

Referring again to FIGS. 3A and 3B, the body 44 of the spoke 14 extends from the first end 40 to the second end 42. In the illustrated embodiment, the body 44 has a flat cross-sectional shape, commonly referred to as a blade style of spoke. However, in other embodiments, the body 44 can have other cross-sectional shapes, such as the non-limiting example of a round cross-sectional shape.

Figure 4:
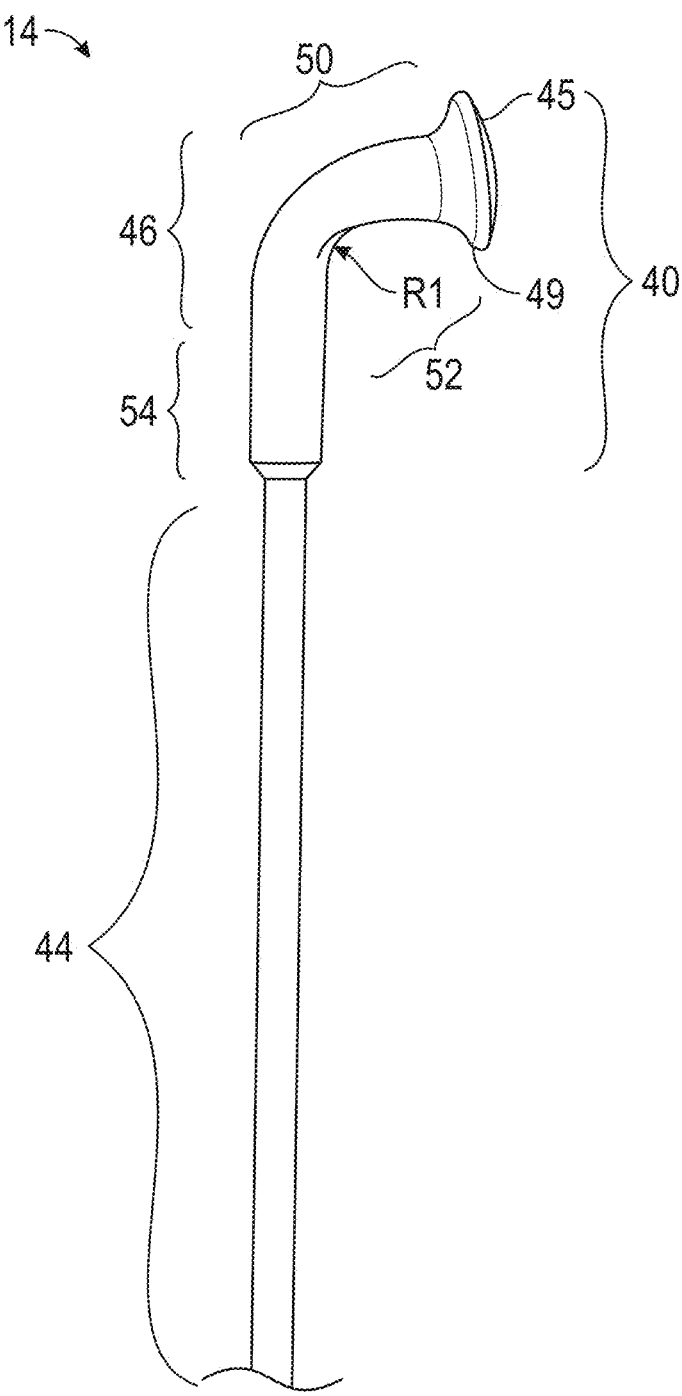
FIG. 4 is an enlarged perspective side view of a portion of the conventional spoke of FIG. 3A.

Referring now to FIG. 4, an enlarged view of the first end 40 of the conventional spoke 14 is illustrated. The J bend section 46 includes a first segment 50 that extends from the tapered portion 49 of the head 45, a radiused segment 52 extending from the first segment 50 to an extension segment 54. The radiused segment 52 has an arcuate inner radius segment 53 having a distance R1.

Figure 5:
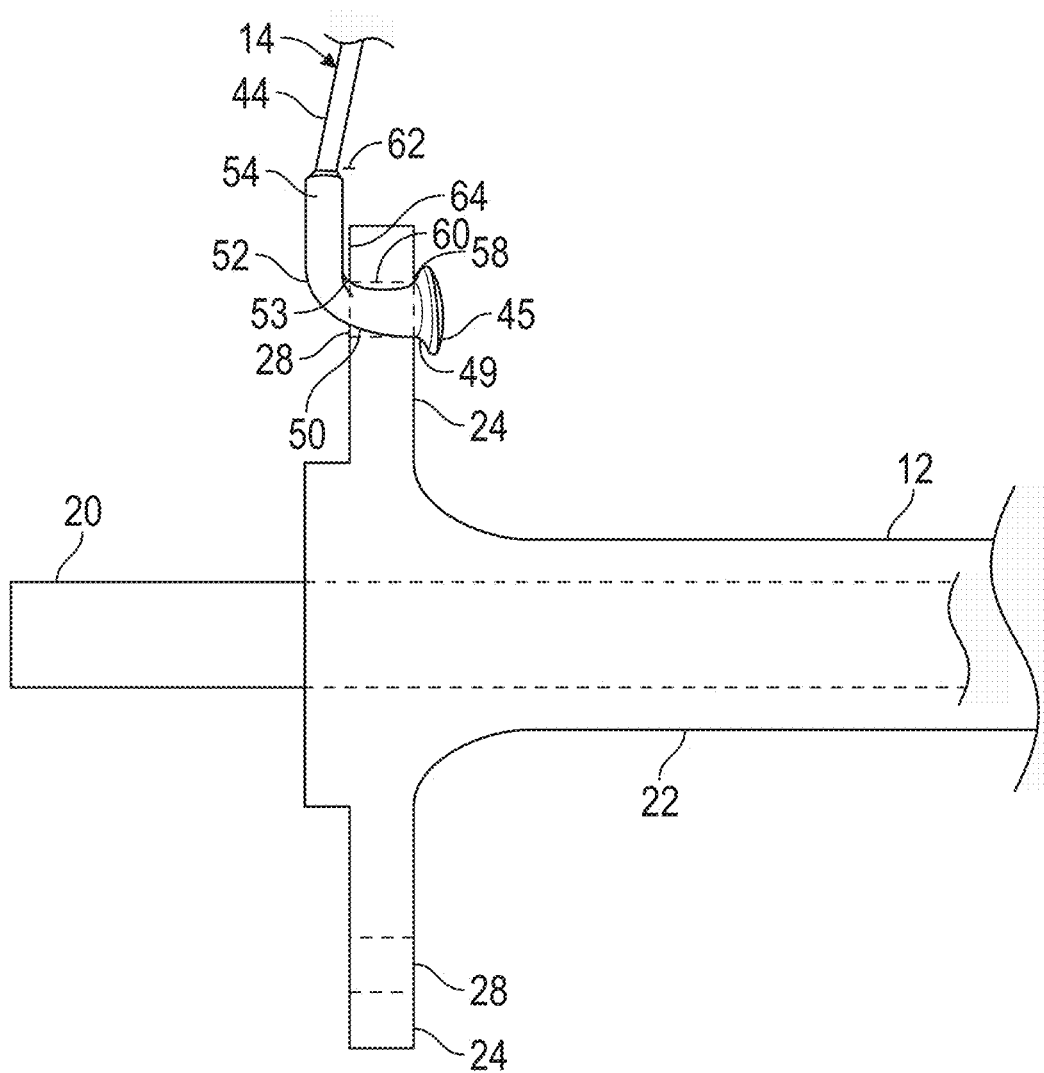
FIG. 5 is a side view of the hub of FIG. 2 illustrating installation of the conventional spoke of FIG. 3A.

Referring now to FIG. 5, a portion of the conventional hub 12 is illustrated with an installed conventional spoke 14 in a "head in" arrangement. The hub 12 includes the axle 20, the hub shaft 22 and the first flange 24. The first flange 24 includes the plurality of circumferential first flange apertures 28. In the "head in" arrangement, the head 45 of the spoke 14 is arranged in an inward position relative to the first flange 24. Further to this arrangement, the tapered portion 49 of the spoke 14 seats in one of the first flange apertures 28, thereby forming a first area of contact 58 between the head 45 of the spoke 14 and the first flange 24. In the installed position, the first segment 50 of the spoke 14 extends through the first flange aperture 28. Also in the installed position, the arcuate inner radius segment 53 of the radiused segment 52 contacts a wall defining the first flange aperture 28, thereby forming a second area of contact 60 between the spoke 14 and the first flange 24.

Referring again to FIG. 5, in the installed arrangement the extension segment 54 extends in a direction away from the radiused segment 52 and toward the outer rim (not shown for purposes of clarity). In the installed arrangement, the extension segment 54 forms a gap 62 with an outer face 64 of the first flange 24. The gap 64 results in a lack of contact between the extension segment 54 of the spoke 14 and the first flange 24. The gap 62 extends continuously along the length of the extension segment 54 from the first flange aperture 28 to the body 44 of the spoke. Without being held to the theory, it is believed the lack of contact and support between the extension segment 54 and the first flange 24 contributes to breakage of the spokes 14 at the J bend section 46 due to vibration and load cycling during wheel rotation under load.

In accordance with the invention, a novel hub and spoke arrangement for a bicycle is presented. Generally, the novel hub and spoke arrangement provides three areas of contact between portions of a spoke and a flange extending from the hub. Without being held to the theory, it is believed the additional third area of contact contributes to the prevention of vibration-related breakage of the spokes at the J bend section due to vibration and load cycling during wheel rotation under load. Advantageously, the three areas of contact arrangement facilitate the use of low spoke counts, with each of the spokes under extremely high static tensions. The use of low spoke counts, each at extremely high static tensions, provides an aerodynamic advantage not seen in conventional hub and spoke arrangements having higher spoke counts with lower spoke static tensions. As will be discussed in more detail below, it should be appreciated that the additional third area of contact can be formed in various manners.

Figure 6:
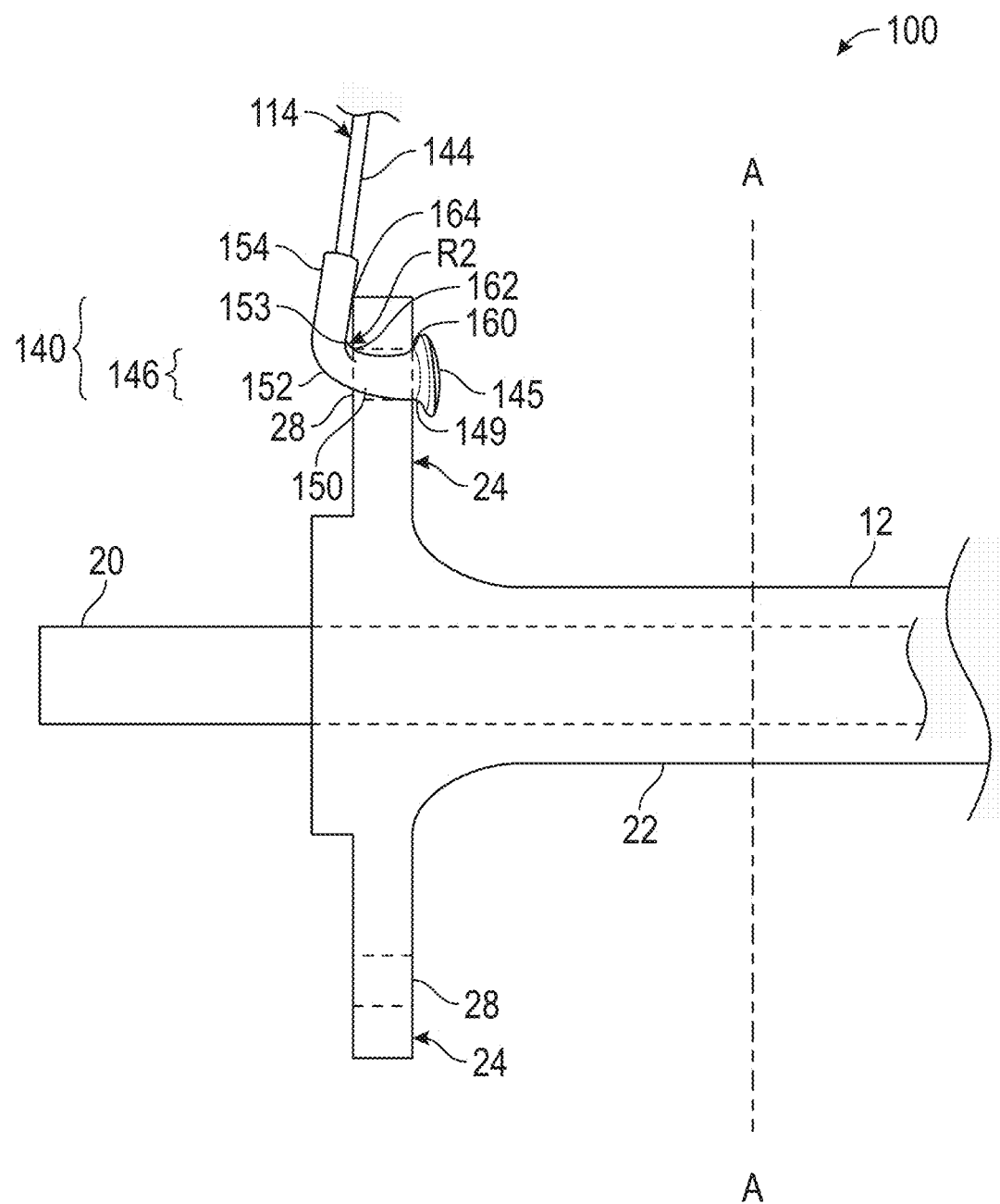
FIG. 6 is a side view of a novel hub and spoke arrangement in accordance with the invention.

Referring now to FIG. 6, a first embodiment of a novel hub and spoke arrangement for a bicycle is shown generally at 100. The novel hub and spoke arrangement 100 includes the conventional axle 20, the hub shaft 22 and the first flange 24. The first flange 24 includes the plurality of circumferential first flange apertures 28 as described above. A spoke 114 includes a first end 140, an opposing second end (not shown for purposes of clarity) and a body 144 extending therebetween. In this embodiment, the spoke 114 is one of a plurality of spokes in a quantity of about 10 to spokes per wheel. Each of the spokes 114 is tensioned in a range of about 300 lbs. to about 500 lbs. However, it should be appreciated in other embodiments, the number of spokes per wheel can be less than about 10 or more than about 12 and the tension of each spoke can be less than about 300 lbs. or more than about 500 lbs., sufficient for the functions described herein. The first end 140 includes a head 145, a J bend section 146 and an extension segment 154. The head 145 includes a tapered portion 149 that extends to a first segment 150. The tapered portion 149 has a circular cross-sectional shape.

Referring again to the embodiment shown in FIG. 6, the J bend section 146 includes the first segment 150 that extends from the tapered portion 149 of the head 145, a radiused segment 152 extending from the first segment 150 to the extension segment 154. The radiused segment 152 has a circular cross-sectional shape and an inner radius 153 having a distance R2. The distance R2 of the radiused segment 152 of the spoke 114 is smaller than the inner radius R1 of the radiused segment 52 of the spoke 14 shown in prior art of FIG. 5. In other words, the smaller inner radius R2 results in closing the arcuate inner radius 153, in contrast to conventional wheel building practices. The smaller radius R2 of the radiused segment 152 of the spoke 114 results in the novel formation of three areas of contact with the first flange 24. The first area of contact, shown at 160, is formed at the area the tapered portion 149 of the head 145 contacts an annular wall defining a first flange aperture 28. The second area of contact, shown at 162, is formed as the arcuate inner radius segment 153 of the radiused segment 152 contacts the same wall defining the first flange aperture 28. The third area of contact, shown at 164, is formed as a portion of the extension section 154 contacts a portion of the first flange 24.

Referring again to FIG. 6, it should be appreciated that the terms "first, second and third areas of contact" can have different configurations depending on the structure of the contacting elements. It is contemplated that the area of contact can be a singular point, a linear segment of contact or a geometrically-shaped contact form. As a first example, the first area of contact 160 is defined above as the location where the tapered portion 149 of the head 145 contacts a wall defining the first flange aperture 28. As the tapered portion 149 of the head 145 has a circular cross-sectional shape and the wall defining the first flange aperture 28 also has a circular cross-sectional shape, it should be appreciated that the "first area of contact" could have the form of a linear segment, in this example an arcuate linear segment, rather than a singular point of contact. As another example, the second area of contact 162 is defined above as the location where the arcuate inner radius segment 153 of the radiused segment 152 contacts the same wall defining the first flange aperture 28. As the arcuate inner radius segment 153 of the radiused segment 152 has a circular cross-sectional shape and the wall defining the first flange aperture 28 also has a circular cross-sectional shape, it should be appreciated that the "second area of contact" could have the form of a linear segment of contact, also in this example an arcuate linear segment rather than a singular point of contact. As a final example, the third area of contact 164 is formed between a portion of the extension section 154 and the first flange 24. In the embodiment shown in FIG. 6, the extension section 154 has a circular cross-sectional shape and the first flange 24 forms a circular outer rim. Accordingly, the third area of contact has the form of a singular point of contact, rather than a linear segment of contact.

Figure 7:
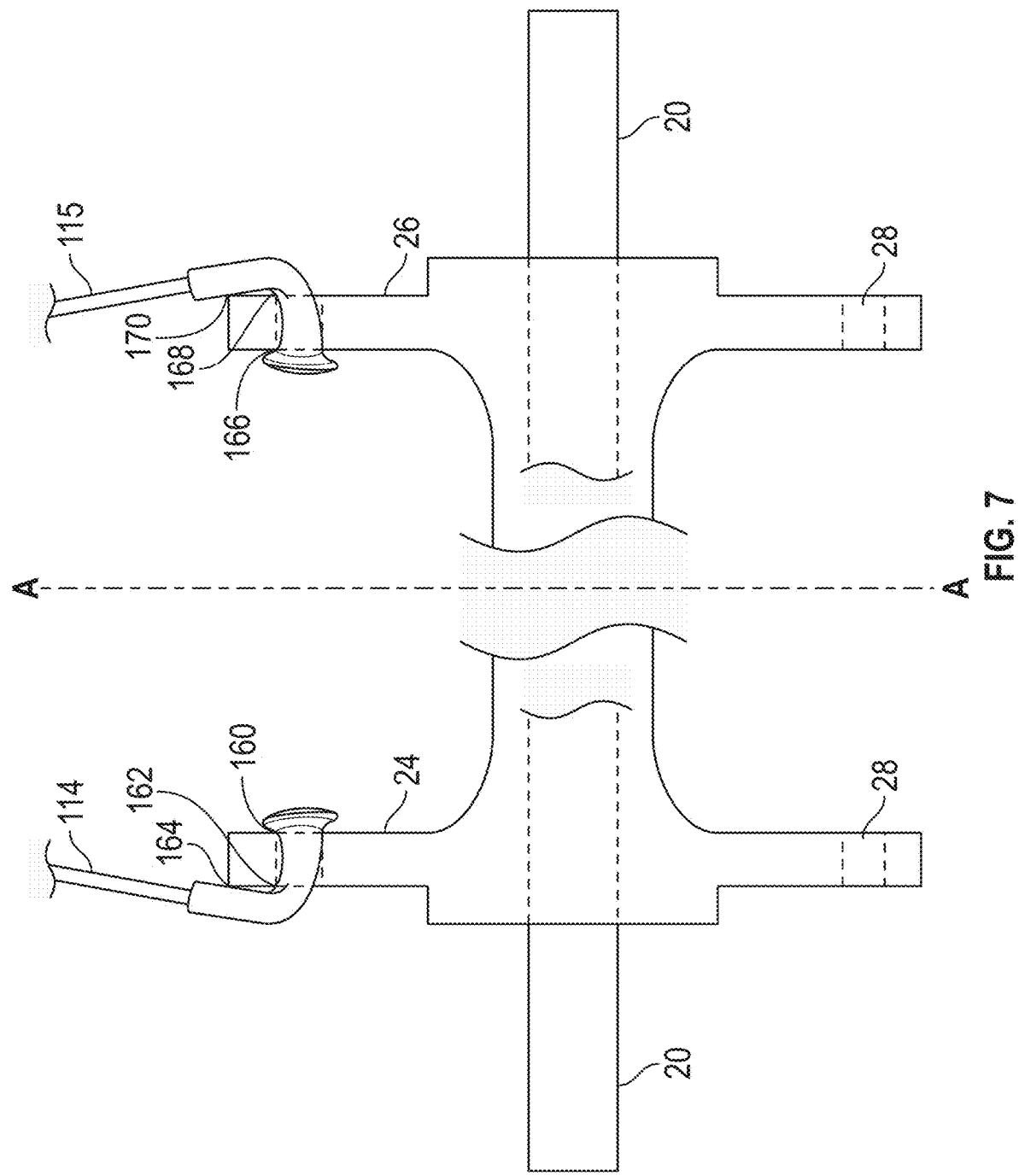
FIG. 7 is a side view of the novel hub and spoke arrangement of FIG. 6, illustrating opposing sets of three areas of contact, in accordance with the invention.

Referring now to FIG. 7, the hub 12 is centered about a vertical plane A-A that includes the outer rim 16 (FIG. 1). The spoke 114, forming the three areas of contact 160, 162 and 164 with the first flange 24 extends to and is connected to the outer rim 16 (FIG. 1). The three areas of contact 160, 162 and 164 are positioned outside the vertical plane A-A. The hub 12 also includes the second flange 26. A second spoke 115 is situated with the second flange 26 in a manner similar to the spoke 114 with the first flange 24 and also forms three areas of contact 166, 168 and 170 with the second flange 26. The three areas of contact 166, 168 and 170 are on opposite sides of the vertical plane A-A as the areas of contact 160, 162 and 164. Without being held to the theory, it is believed that in addition to each of the sets of three contacts 160, 162, 164 and 166, 168, 170 contributing to the prevention of vibration-related breakage of the spokes at the J bend sections due to vibration and load cycling during wheel rotation under load, but also the opposed relationship of the sets of three contacts 160, 162, 164 and 166, 168, 170 on either side of the vertical plane A-A further contributes to the stability provided to the J bend sections during load cycling during wheel rotation under load.

Referring again to the embodiment shown in FIGS. 6 and 7, it should be appreciated that the smaller arcuate inner radius 153 can be formed with various methods. In one non-limiting example, the hub of an assembled wheel incorporating the novel hub and spoke arrangement can be subjected to lateral forces sufficient to displace the hub in a corresponding direction, thereby decreasing the arcuate inner radius of the outward spokes and forcing contact of the extension portions of the spokes with the associated flange. Once the force is applied in the first direction, the hub can be subjected to lateral forces in the opposing direction to affect the decreasing of the arcuate inner radius of the opposing side spokes.

As another non-limiting example of forming the smaller arcuate inner radius, it is contemplated that the spokes can be pre-formed prior to assembly with the hub.

Figure 8:
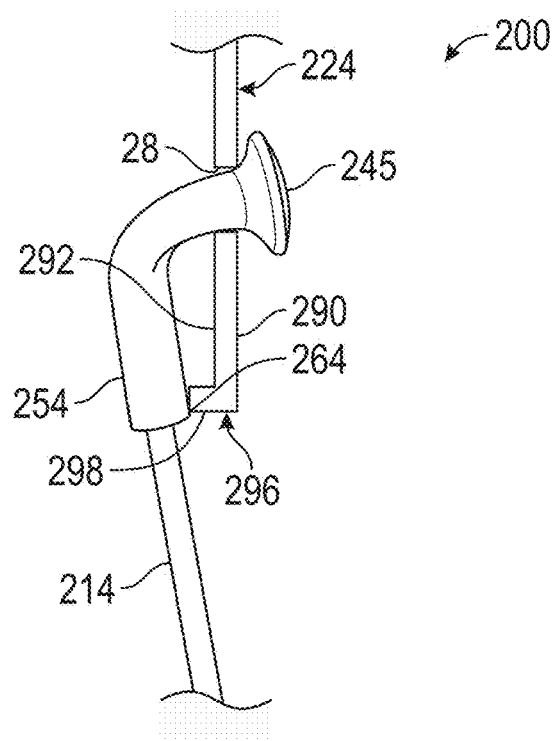
FIG. 8 is a side view of a second embodiment of a novel hub and spoke arrangement.

While the embodiment of the novel hub and spoke arrangement shown in FIGS. 6 and 7 contemplate the use of flanges of conventional hubs, it is further contemplated that the third area of contact can be formed from hubs incorporating other structures, mechanisms, and devices. Referring now to FIG. 8, a second embodiment of a novel hub and spoke arrangement is provided at 200. The novel hub and spoke arrangement 200 includes a first flange 224 and a spoke 214. The first flange 224 includes the plurality of circumferential first flange apertures 28 as described above. As described above, a head 245 of the spoke 214 seats within the first flange aperture 28. The first flange 224 includes an inner face 290, an outer face 292 and an outer edge 296. The inner face 290 and the outer face 292 can be substantially parallel with each other, although such is not necessary. The outer edge 296 includes a nub 298, configured to extend from the outer face 292 in a direction toward the extension segment 254. In an installed orientation, the nub 298 contacts the extension segment 254 of the spoke 214, thereby forming a third of contact 264 between the spoke 214 and the first flange 224.

Figure 9:
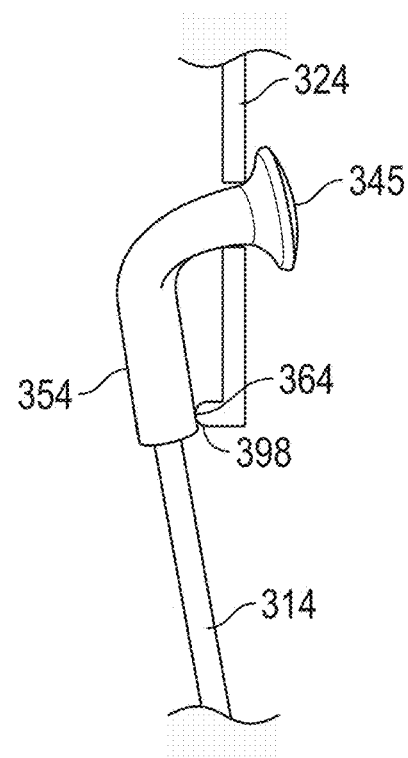
FIG. 9 is a side view of a third embodiment of a novel hub and spoke arrangement.

In the embodiment illustrated in FIG. 8, the nub 298 has a squared cross-sectional shape sufficient to seat against a portion of the extension segment 254. However, in other embodiments, the nub 298 can have other cross-sectional shapes. Referring now to FIG. 9 in another embodiment, a nub 398 formed on a first flange 324 illustrates another non-limiting example in the form of a nub 398 having a rounded cross-sectional shape. It should be apparent that the size and cross-sectional shape of the nub 398 need only to be sufficient to contact the extension segment 354 of the spoke 314, thereby forming the third area of contact 364.

Figure 10:
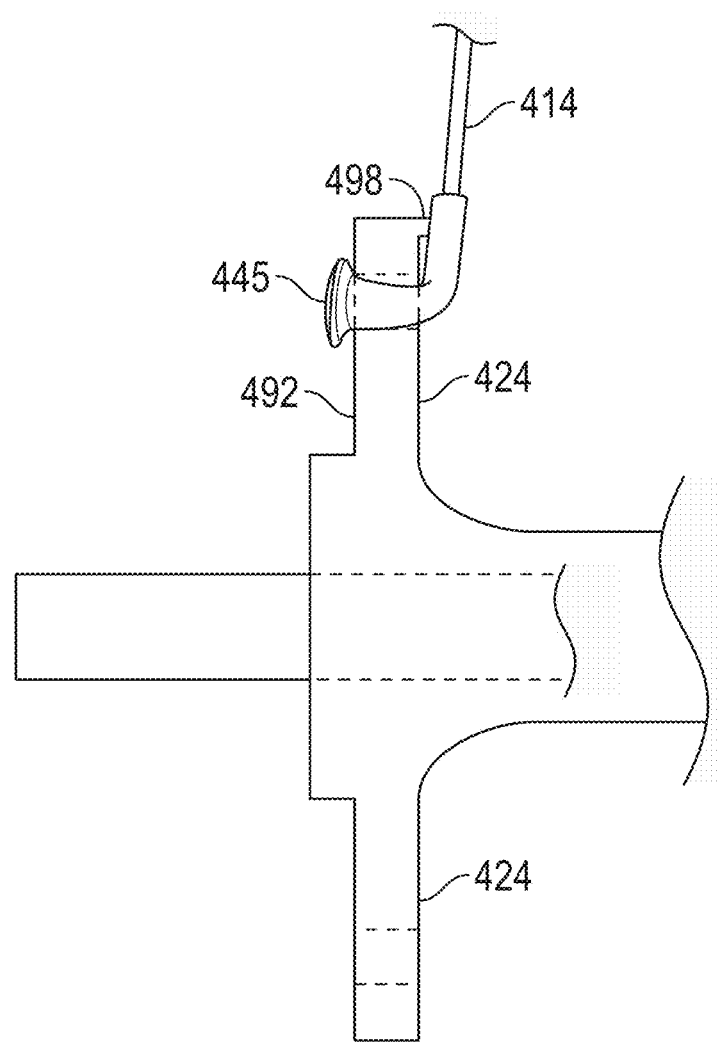
FIG. 10 is a side view of a fourth embodiment of a novel hub and spoke arrangement, illustrating a head out arrangement.

Referring to the embodiments shown in FIGS. 6-9, each of the spokes 114, 214 and 314 has a "head-in" orientation. That is, each of the heads 145, 245 and 345 of the corresponding spokes 114, 214, 314 is arranged in an inward position relative to the associated flange 24, 224 and 324. It should be appreciated that in other embodiments, the heads of each of the spokes can have a "head-out" orientation. That is, the head of each of the spokes is arranged in an outward position relative to an associated flange. Referring now to FIG. 10 in one non-limiting example, the head 445 of each of the spokes 414 is seated adjacent an outer face 492 of the flange 424. As shown in FIG. 10, a nub 498 will be reversed from that shown in FIGS. 8 and 9.

While the novel hub and spoke arrangement has been shown in the figures and described above with certain "head-in" and "head-out" arrangements and with certain spoke counts, it should be appreciated that in other embodiments, other spoke counts and spoke arrangements can be provided. Referring now to FIGS. 11-25, other "head-in" and "head-out" arrangements and certain spoke counts and spoke arrangements are illustrated.

Figure 11:
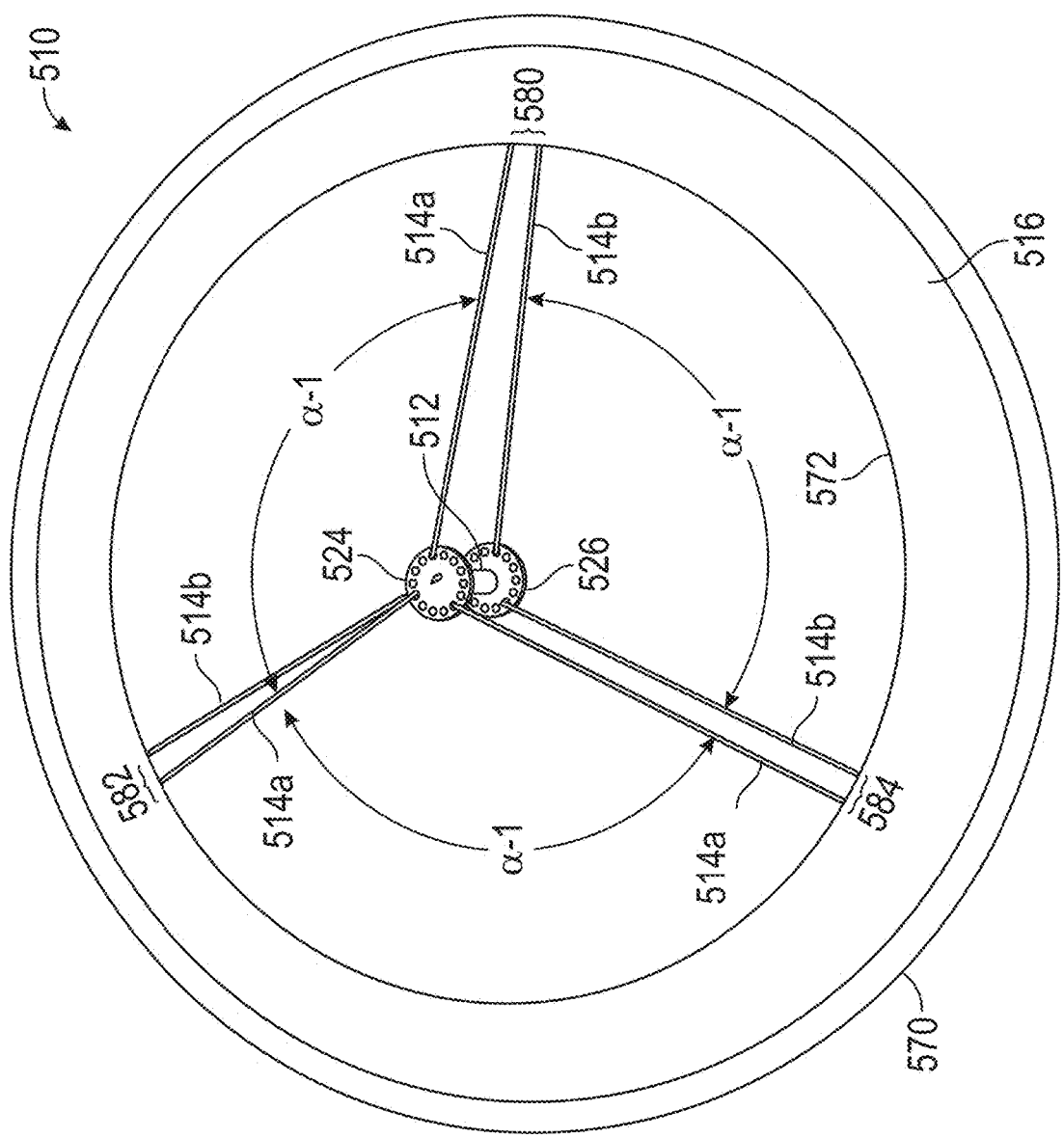
FIG. 11 is a perspective view of a first embodiment of a bicycle wheel incorporating a novel hub and spoke arrangement having a total of six spokes.

Referring first to FIG. 11, one non-limiting embodiment of a bicycle wheel 510 is illustrated. The bicycle wheel 510 includes a hub 512 extending from a first flange 524 to a second flange 526. In the illustrated embodiment, the hub 512, first flange 524 and second flange 526 are the same as, or similar to, the hub 12, first flange 24 and second flange 26 shown in FIG. 2 and described above. It should be appreciated that in other embodiments, the hub 512, first flange 524 and second flange 526 can be different from the hub 12, first flange 24 and second flange 26, sufficient for the functions described herein.

Referring again to FIG. 11, the bicycle wheel 510 also includes a plurality of spokes 514a, 514b extending from the first and second flanges 524, 526 to an outer rim 516. In the illustrated embodiment, each of the plurality of spokes 514a, 514b is the same as, or similar to, the spoke 14 shown in FIGS. 3A, 3B and described above. It should be appreciated that in other embodiments, each of the spokes 514a, 514b can be different from the spoke 14, sufficient for the functions described herein.

Referring again to FIG. 11, a tire 570 is connected to the outer rim 516. The tire 570 can have any desired shape, size, and configuration sufficient for the functions described herein.

Referring again to FIG. 11, the plurality of spokes 514a, 514b form a spoke count. In the illustrated embodiment, the spoke count provides a quantity of six (6) spokes, arranged in groupings. This spoke arrangement can be described as the first spoke 514a extends from the first flange 524 through an inner portion 572 of the rim 516 and a corresponding second spoke 514b extends from the second flange 526 through an inner portion 572 of the rim 516 proximate the first spoke 514, thereby forming a first grouping 580 of spokes. In a similar manner, a second grouping of spokes 582 and a third grouping 584 of spokes are formed.

Referring again to the embodiment shown in FIG. 11, each of the groupings 580, 582, 584 of spokes form a centerline (not shown for purposes of clarity). The centerlines of the groupings 580, 582, 584 are spaced apart by an angle $\alpha$-1. The angle $\alpha$-1 is configured to facilitate structural support of the rim 516 and tire 570. In the illustrated embodiment, the angle $\alpha$-1 is 120°.

Referring again to the embodiment shown in FIG. 11, it should be appreciated that in each of the groupings 580, 582, 584 of the spokes, the spoke 514a and the spoke 514b have no contact with each other as each of the spokes extends from the first and second flanges 524, 526 to the rim 516.

Referring again to FIG. 11, each of the plurality of spokes 514a, 514b attaches to either of the first and second flanges 524, 526 as shown in FIGS. 7-10 and described above. That is, each of the spokes 514a, 514b can have a "head-in" or a "head-out" arrangement.

While the embodiment shown in FIG. 11 has a quantity of six (6) spokes arranged as shown, it should be appreciated that in other embodiments having a quantity of six (6) spokes, the spokes can be arranged in other orientations.

Figure 12:
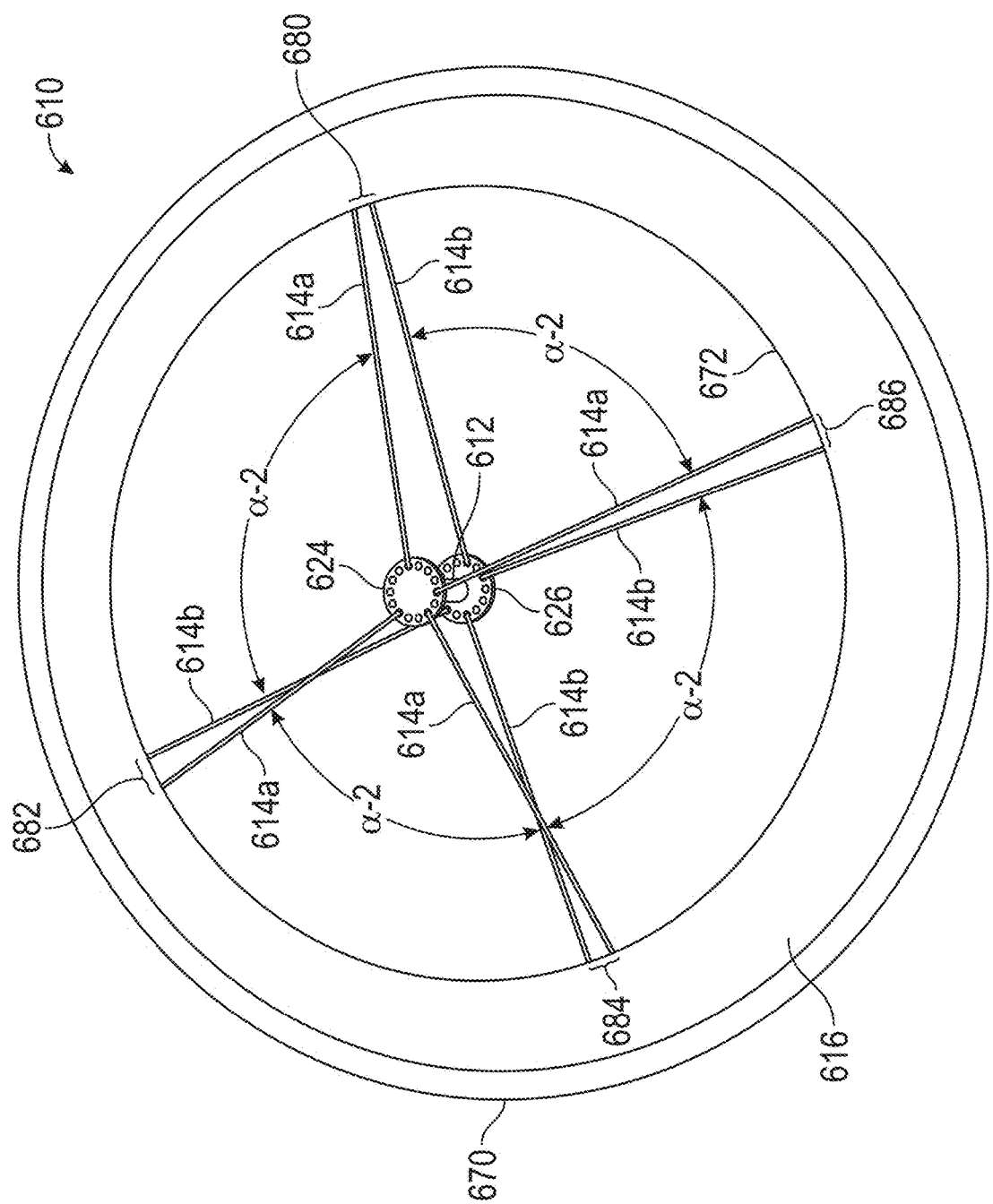
FIG. 12 is a perspective view of another embodiment of a bicycle wheel incorporating a novel hub and spoke arrangement having a total of eight spokes arranged in a non-contact orientation.

Referring now to FIG. 12, another non-limiting embodiment of a bicycle wheel 610 is illustrated. The bicycle wheel 610 includes a hub 612 extending from a first flange 624 to a second flange 626. In the illustrated embodiment, the hub 612, first flange 624 and second flange 626 are the same as, or similar to, the hub 12, first flange 24 and second flange 26 shown in FIG. 2 and described above. It should be appreciated that in other embodiments, the hub 612, first flange 624 and second flange 626 can be different from the hub 12, first flange 24 and second flange 26, sufficient for the functions described herein.

Referring again to FIG. 12, the bicycle wheel 610 also includes a plurality of spokes 614a, 614b extending from the first and second flanges 624, 626 to an outer rim 616. In the illustrated embodiment, each of the plurality of spokes 614a, 614b is the same as, or similar to, the spoke 14 shown in FIGS. 3A, 3B and described above. It should be appreciated that in other embodiments, each of the spokes 614a, 614b can be different from the spoke 14, sufficient for the functions described herein.

Referring again to FIG. 12, a tire 670 is connected to the outer rim 616. The tire 670 can have any desired shape, size, and configuration sufficient for the functions described herein.

Referring again to FIG. 12, the plurality of spokes 614a, 614b form a spoke count. In the illustrated embodiment, the spoke count provides a quantity of eight (8) spokes, arranged in groupings. This spoke arrangement can be described as the first spoke 614a extends from the first flange 624 through an inner portion 672 of the rim 616 and a corresponding second spoke 614b extends from the second flange 626 through an inner portion 672 of the rim 616 proximate the first spoke 614, thereby forming a first grouping 680 of spokes. In a similar manner, a second grouping of spokes 682, third grouping 684 and fourth grouping of spokes 686 are formed.

Referring again to the embodiment shown in FIG. 12, the groupings 680, 682, 684, 686 of spokes form a centerline (not shown for purposes of clarity). The centerlines of the groupings 680, 682, 684, 686 are spaced apart by an angle $\alpha$-2. The angle $\alpha$-2 is configured to facilitate structural support of the rim 616 and tire 670. In the illustrated embodiment, the angle $\alpha$-2 is 90°.

Referring again to the embodiment shown in FIG. 12, it should be appreciated that in each of the groupings 680, 682, 684, 686 of the spokes, the spoke 614a and the spoke 614b have no contact with each other as each of the spokes extends from the first and second flanges 624, 626 to the rim 616.

Referring again to FIG. 12, each of the plurality of spokes 614a, 614b attaches to either of the first and second flanges 624, 626 as shown in FIGS. 7-10 and described above. That is, each of the spokes 614a, 614b can have a "head-in" or a "head-out" arrangement.

While the embodiment shown in FIG. 12 has a quantity of eight (8) spokes arranged as shown, it should be appreciated that in other embodiments having a quantity of eight (8) spokes, the spokes can be arranged in other orientations.

Figure 13:
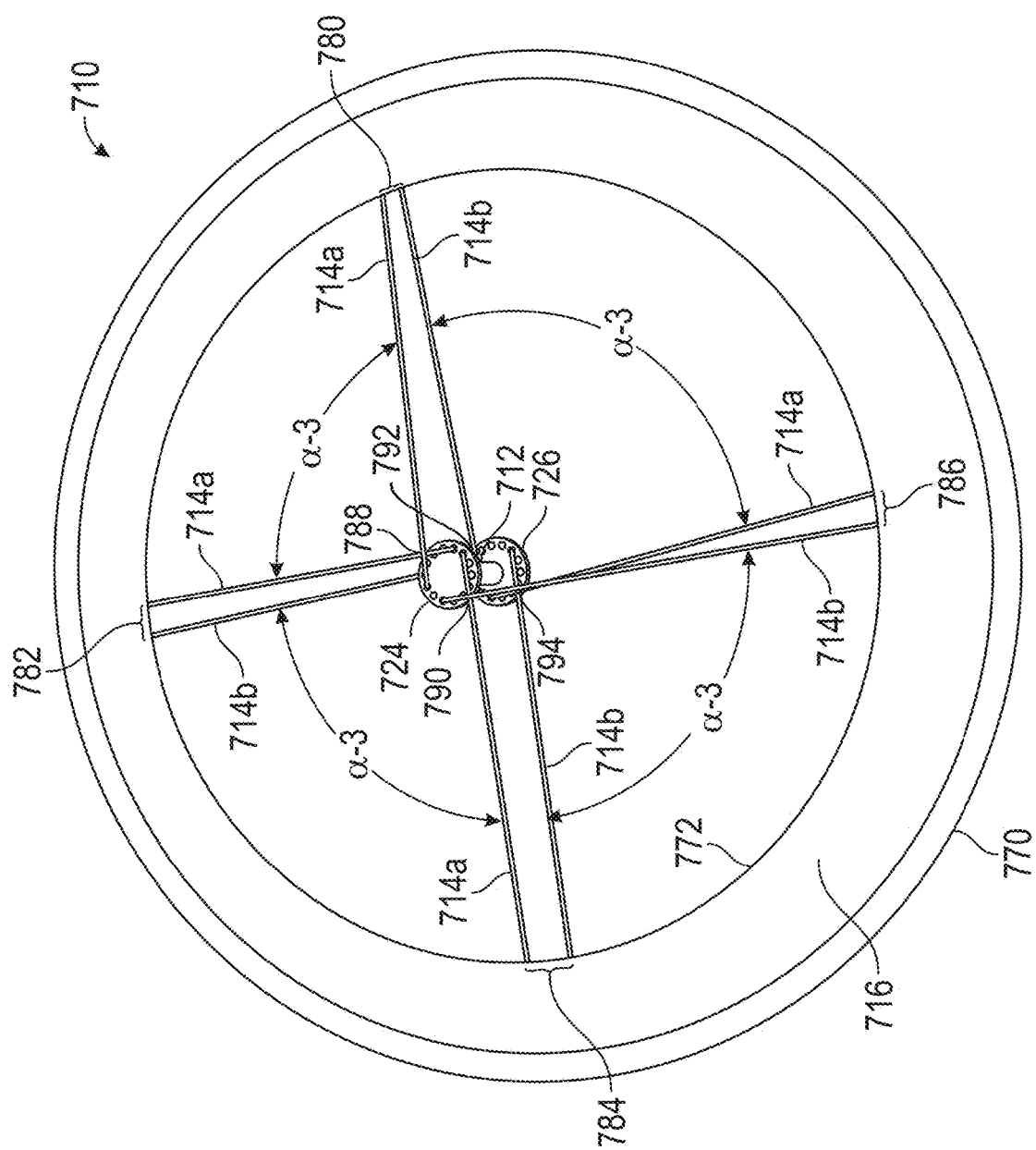
FIG. 13 is a perspective view of another embodiment of a bicycle wheel incorporating a novel hub and spoke arrangement having a total of eight spokes arranged to form intersections.

Referring now to FIG. 13, another non-limiting embodiment of a bicycle wheel 710 is illustrated. The bicycle wheel 710 includes a hub 712 extending from a first flange 724 to a second flange 726. In the illustrated embodiment, the hub 712, first flange 724 and second flange 726 are the same as, or similar to, the hub 12, first flange 24 and second flange 26 shown in FIG. 2 and described above. It should be appreciated that in other embodiments, the hub 712, first flange 724 and second flange 726 can be different from the hub 12, first flange 24 and second flange 26, sufficient for the functions described herein.

Referring again to FIG. 13, the bicycle wheel 710 also includes a plurality of spokes 714a, 714b extending from the first and second flanges 724, 726 to an outer rim 716. In the illustrated embodiment, each of the plurality of spokes 714a, 714b is the same as, or similar to, the spoke 14 shown in FIGS. 3A, 3B and described above. It should be appreciated that in other embodiments, each of the spokes 714a, 714b can be different from the spoke 14, sufficient for the functions described herein.

Referring again to FIG. 13, a tire 770 is connected to the outer rim 716. The tire 770 can have any desired shape, size, and configuration sufficient for the functions described herein.

Referring again to FIG. 13, the plurality of spokes 714a, 714b form a spoke count. In the illustrated embodiment, the spoke count provides a quantity of eight (8) spokes, arranged in groupings. This spoke arrangement can be described as the first spoke 714a extends from the first flange 724 through an inner portion 772 of the rim 716. A corresponding first spoke 714a crosses the first spoke 714a and forms a first intersection 788. The first intersection 788 forms a point of contact between the adjacent spokes 714a. In a similar manner, a second intersection 790 is formed by the remaining first spokes 714a, which forms a point of contact between the adjacent spokes 714a. In similar manners, a third intersection 792 is formed as adjacent second spokes 714b cross, thereby forming a point of contact and a fourth intersection 794 is formed as adjacent second spokes 714b cross, thereby also forming a point of contact.

Referring again to FIG. 13, the spoke arrangement further includes a second spoke 714b extending from the first flange 724 through an inner portion 772 of the rim 716. A corresponding second spoke 714b crosses the second spoke 714b and forms a third intersection (not shown for purposes of clarity). The third intersection 792 forms a point of contact between the spokes 714b. In a similar manner, a fourth intersection 792 is formed by the remaining second spokes 714b. The third and fourth intersections form a "cross-laced" spoke arrangement as is known in the art.

Referring again to FIG. 13, the corresponding spokes 714a, 714b form groupings 780, 782, 784, 786 of spokes.

Referring again to the embodiment shown in FIG. 13, each of the groupings 780, 782, 784, 786 of spokes form a centerline (not shown for purposes of clarity). The centerlines of the groupings 780, 782, 784, 786 are spaced apart by an angle $\alpha$-3. The angle $\alpha$-3 is configured to facilitate structural support of the rim 716 and tire 770. In the illustrated embodiment, the angle $\alpha$-3 is 90°.

Referring again to FIG. 13, each of the plurality of spokes 714a, 714b attaches to either of the first and second flanges 724, 726 as shown in FIGS. 7-10 and described above. That is, each of the spokes 714a, 714b can have a "head-in" or a "head-out" arrangement.

While the embodiment shown in FIG. 13 has a quantity of eight (8) spokes arranged as shown, it should be appreciated that in other embodiments having a quantity of eight (8) spokes, the spokes can be arranged in other orientations.

Figure 14:
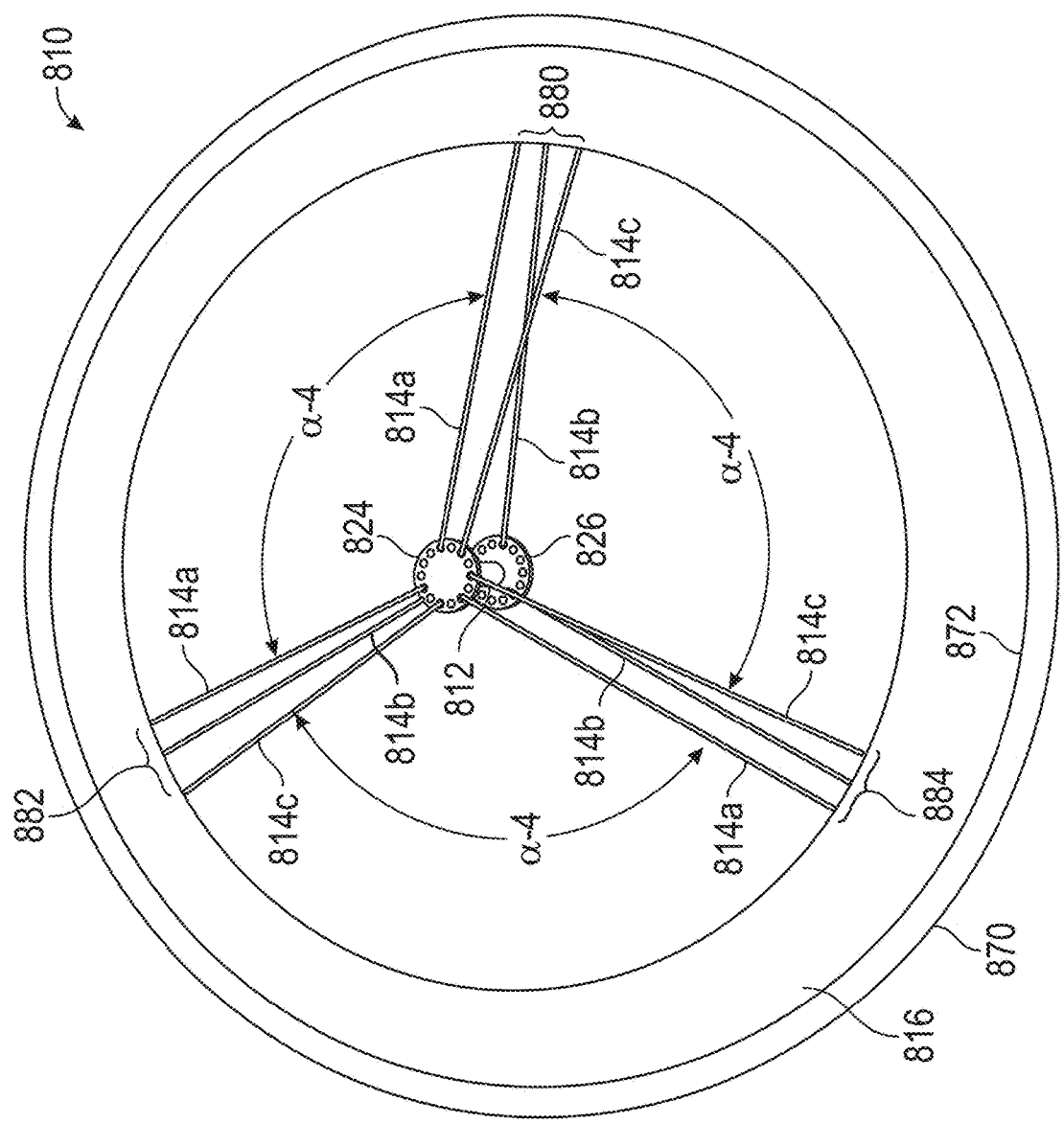
FIG. 14 is a perspective view of another embodiment of a bicycle wheel incorporating a novel hub and spoke arrangement having a total of nine spokes arranged in a non-contact orientation.

Referring now to FIG. 14, another non-limiting embodiment of a bicycle wheel 810 is illustrated. The bicycle wheel 810 includes a hub 812 extending from a first flange 824 to a second flange 826. In the illustrated embodiment, the hub 812, first flange 824 and second flange 826 are the same as, or similar to, the hub 12, first flange 24 and second flange 26 shown in FIG. 2 and described above. It should be appreciated that in other embodiments, the hub 812, first flange 824 and second flange 826 can be different from the hub 12, first flange 24 and second flange 26, sufficient for the functions described herein.

Referring again to FIG. 14, the bicycle wheel 810 also includes a plurality of spokes 814a, 814b, 814c extending from the first and second flanges 824, 826 to an outer rim 816. In the illustrated embodiment, each of the plurality of spokes 814a, 814b, 814c is the same as, or similar to, the spoke 14 shown in FIGS. 3A, 3B and described above. It should be appreciated that in other embodiments, each of the spokes 814a, 814b, 814c can be different from the spoke 14, sufficient for the functions described herein.

Referring again to FIG. 14, a tire 870 is connected to the outer rim 816. The tire 870 can have any desired shape, size, and configuration sufficient for the functions described herein.

Referring again to FIG. 14, the plurality of spokes 814a, 814b, 814c form a spoke count. In the illustrated embodiment, the spoke count provides a quantity of nine (9) spokes, arranged in triplicate groupings. This spoke arrangement can be described as the first spoke 814a and the third spoke 814c extend from the first flange 824 through an inner portion 872 of the rim 816 and a corresponding second spoke 814b extends from the second flange 826 through an inner portion 872 of the rim 816 proximate the first and third spokes 814a, 814c thereby forming a first triplicate grouping 880 of spokes. In a similar manner, a second and third triplicate grouping of spokes 882, 884 are formed.

Referring again to the embodiment shown in FIG. 14, each of the triplicate groupings 880, 882, 884 of spokes form a centerline (not shown for purposes of clarity). The centerlines are spaced apart by an angle α-4. The angle α-4 is configured to facilitate structural support of the rim 816 and tire 870. In the illustrated embodiment, the angle α-4 is 120°.

Referring again to the embodiment shown in FIG. 14, it should be appreciated that in each of the triplicate groupings 880, 882, 884 of the spokes, the spokes 814a, 814b, 814c have no contact with each other as each of the spokes extends from the first and second flanges 824, 826 to the rim 816.

Referring again to FIG. 14, each of the plurality of spokes 814a, 814b, 814c attaches to either of the first and second flanges 824, 826 as shown in FIGS. 7-10 and described above. That is, each of the spokes 814a, 814b, 814c can have a "head-in" or a "head-out" arrangement.

While the embodiment shown in FIG. 14 has a quantity of nine (9) spokes arranged as shown, it should be appreciated that in other embodiments having a quantity of nine (9) spokes, the spokes can be arranged in other orientations including the non-limiting example of forming points of contact with spokes extending from the same flanges.

Figure 15:
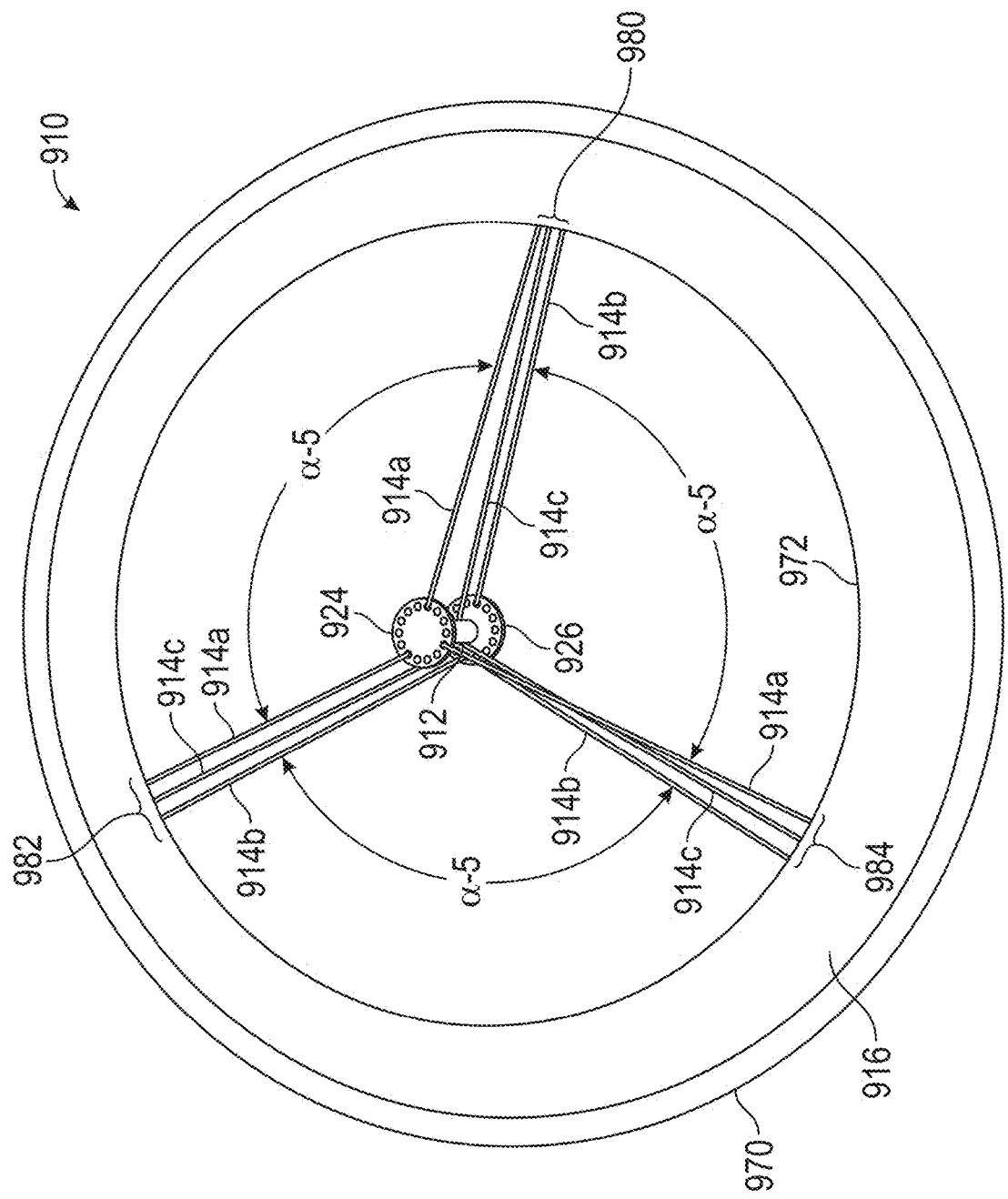
FIG. 15 is a perspective view of another embodiment of a bicycle wheel incorporating a novel hub and spoke arrangement having a total of nine spokes also arranged in a non-contact orientation.

Referring now to FIG. 15, another non-limiting embodiment of a bicycle wheel 910 is illustrated. The bicycle wheel 910 includes a hub 912 extending from a first flange 924 to a second flange 926. In the illustrated embodiment, the hub 912, first flange 924 and second flange 926 are the same as, or similar to, the hub 12, first flange 24 and second flange 26 shown in FIG. 2 and described above. It should be appreciated that in other embodiments, the hub 912, first flange 924 and second flange 926 can be different from the hub 12, first flange 24 and second flange 26, sufficient for the functions described herein.

Referring again to FIG. 15, the bicycle wheel 910 also includes a plurality of spokes 914a, 914b, 914c. In the illustrated embodiment, each of the plurality of spokes 914a, 914b, 914c is the same as, or similar to, the spoke 14 shown in FIGS. 3A, 3B and described above. It should be appreciated that in other embodiments, each of the spokes 914a, 914b, 914c can be different from the spoke 14, sufficient for the functions described herein.

Referring again to FIG. 15, a tire 970 is connected to the outer rim 916. The tire 970 can have any desired shape, size, and configuration sufficient for the functions described herein.

Referring again to FIG. 15, the plurality of spokes 914a, 914b, 914c form a spoke count. In the illustrated embodiment, the spoke count provides a quantity of nine (9) spokes, arranged in triplicate groupings. This spoke arrangement can be described as the first spoke 914a extends from the first flange 924 through an inner portion 972 of the rim 916. The second spoke 914b extends from the second flange 926 through the inner portion 972 of the rim 916. Finally, the third spoke 914c extends from the hub 912 through the inner portion 972 of the rim 916. The arrangement of the three spokes 914a, 914b and 914c form a first triplicate 980 of spokes. In a similar manner, a second and third triplicate groupings of spokes 982, 984 are formed.

Referring again to the embodiment shown in FIG. 15, it should be appreciated that the spokes 914c can be attached to the hub 912 with various mechanisms, devices, and structures, including the non-limiting examples of another flange or internally arranged fasteners.

Referring again to the embodiment shown in FIG. 15, each of the triplicate groupings 980, 982, 984 of spokes forms a centerline (not shown for purposes of clarity). The centerlines are spaced apart by an angle α-5. The angle α-5 is configured to facilitate structural support of the rim 916 and tire 970. In the illustrated embodiment, the angle α-5 is 120°.

Referring again to the embodiment shown in FIG. 15, it should be appreciated that in each of the triplicate groupings 980, 982, 984 of the spokes, the spokes 914a, 914b, 914c have no contact with each other as each of the spokes extends from the first and second flanges 924, 926 and the hub 912 to the rim 916.

Referring again to FIG. 15, each of the plurality of spokes 914a, 914b, attaches to either of the first and second flanges 924, 926 as shown in FIGS. 7-10 and described above. That is, each of the spokes 914a, 914b can have a "head-in" or a "head-out" arrangement.

While the embodiment shown in FIG. 15 has a quantity of nine (9) spokes arranged as shown, it should be appreciated that in other embodiments having a quantity of nine (9) spokes, the spokes can be arranged in other orientations.

Figure 16:
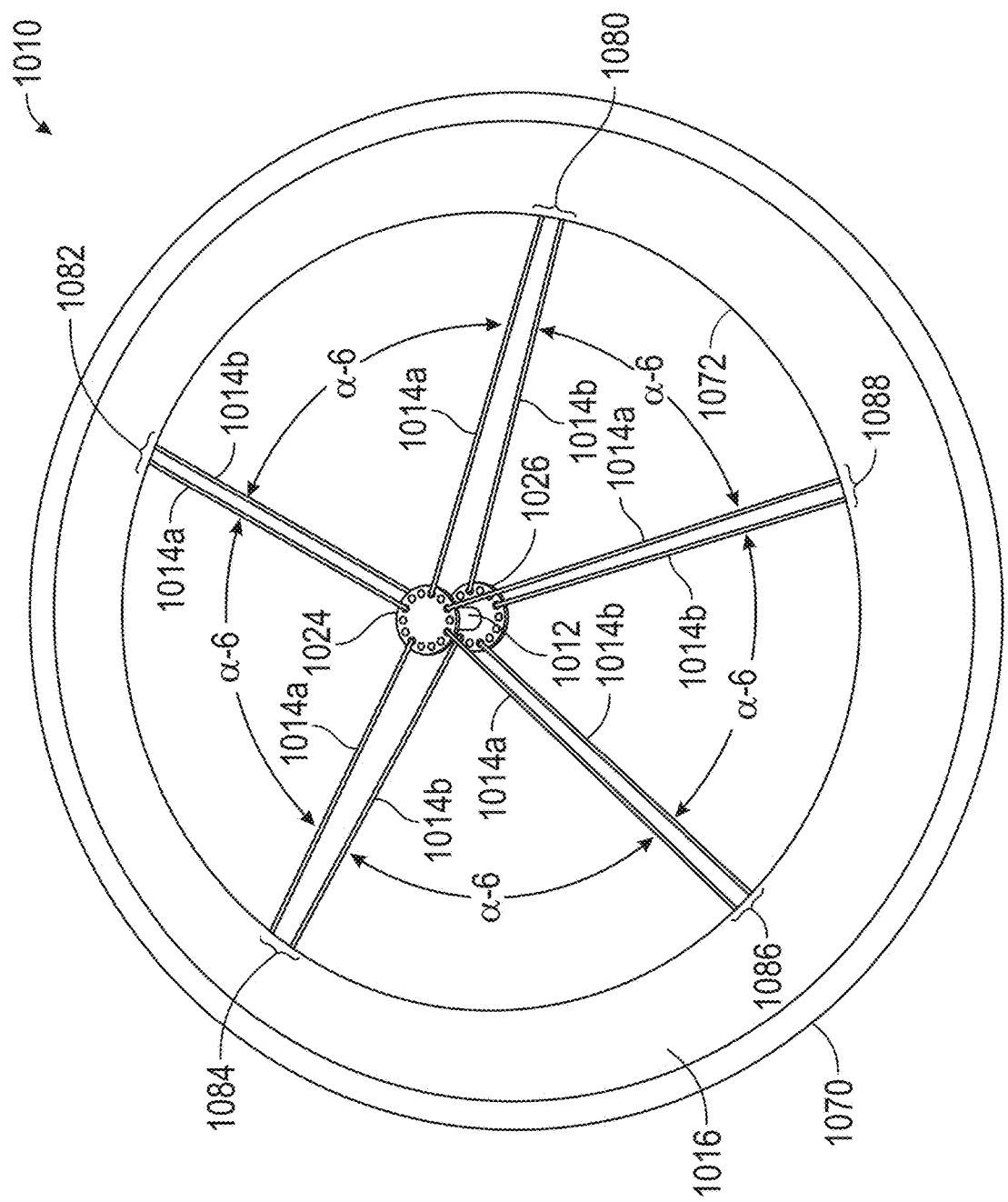
FIG. 16 is a perspective view of another embodiment of a bicycle wheel incorporating a novel hub and spoke arrangement having a total of ten spokes arranged in a non-contact orientation.

Referring now to FIG. 16, another non-limiting embodiment of a bicycle wheel 1010 is illustrated. The bicycle wheel 1010 includes a hub 1012 extending from a first flange 1024 to a second flange 1026. In the illustrated embodiment, the hub 1012, first flange 1024 and second flange 1026 are the same as, or similar to, the hub 12, first flange 24 and second flange 26 shown in FIG. 2 and described above. It should be appreciated that in other embodiments, the hub 1012, first flange 1024 and second flange 1026 can be different from the hub 12, first flange 24 and second flange 26, sufficient for the functions described herein.

Referring again to FIG. 16, the bicycle wheel 1010 also includes a plurality of spokes 1014a, 1014b extending from the first and second flanges 1024, 1026 to an outer rim 1016. In the illustrated embodiment, each of the plurality of spokes 1014a, 1014b is the same as, or similar to, the spoke 14 shown in FIGS. 3A, 3B and described above. It should be appreciated that in other embodiments, each of the spokes 1014a, 1014b can be different from the spoke 14, sufficient for the functions described herein.

Referring again to FIG. 16, a tire 1070 is connected to the outer rim 1016. The tire 1070 can have any desired shape, size, and configuration sufficient for the functions described herein.

Referring again to FIG. 16, the plurality of spokes 1014a, 1014b form a spoke count. In the illustrated embodiment, the spoke count provides a quantity of ten (10) spokes, arranged in groupings. This spoke arrangement can be described as the first spoke 1014a extends from the first flange 1024 through an inner portion 1072 of the rim 1016 and a corresponding second spoke 1014b extends from the second flange 1026 through the inner portion 1072 of the rim 1016 proximate the first spoke 1014a, thereby forming a first grouping 1080 of spokes. In a similar manner, a second, third, fourth and fifth grouping of spokes 1082, 1084, 1086, 1088 are formed.

Referring again to the embodiment shown in FIG. 16, each of the groupings 1080, 1082, 1084, 1086, 1088 of spokes form a centerline (not shown for purposes of clarity). The centerlines are spaced apart by an angle α-6. The angle α-6 is configured to facilitate structural support of the rim 1016 and tire 1070. In the illustrated embodiment, the angle α-6 is 72°.

Referring again to the embodiment shown in FIG. 16, it should be appreciated that in each of the groupings 1080, 1082, 1084. 1086, 1088 of the spokes, the spoke 1014*a* and the spoke 1014*b* have no contact with each other as each of the spokes extends from the first and second flanges 1024, 1026 to the rim 1016.

Referring again to FIG. 16, each of the plurality of spokes 1014*a*, 1014*b* attaches to either of the first and second flanges 1024, 1026 as shown in FIGS. 7-10 and described above. That is, each of the spokes 1014*a*, 1014*b* can have a "head-in" or a "head-out" arrangement.

While the embodiment shown in FIG. 16 has a quantity of ten (10) spokes arranged as shown, it should be appreciated that in other embodiments having a quantity of ten (10) spokes, the spokes can be arranged in other orientations.

Figure 17:
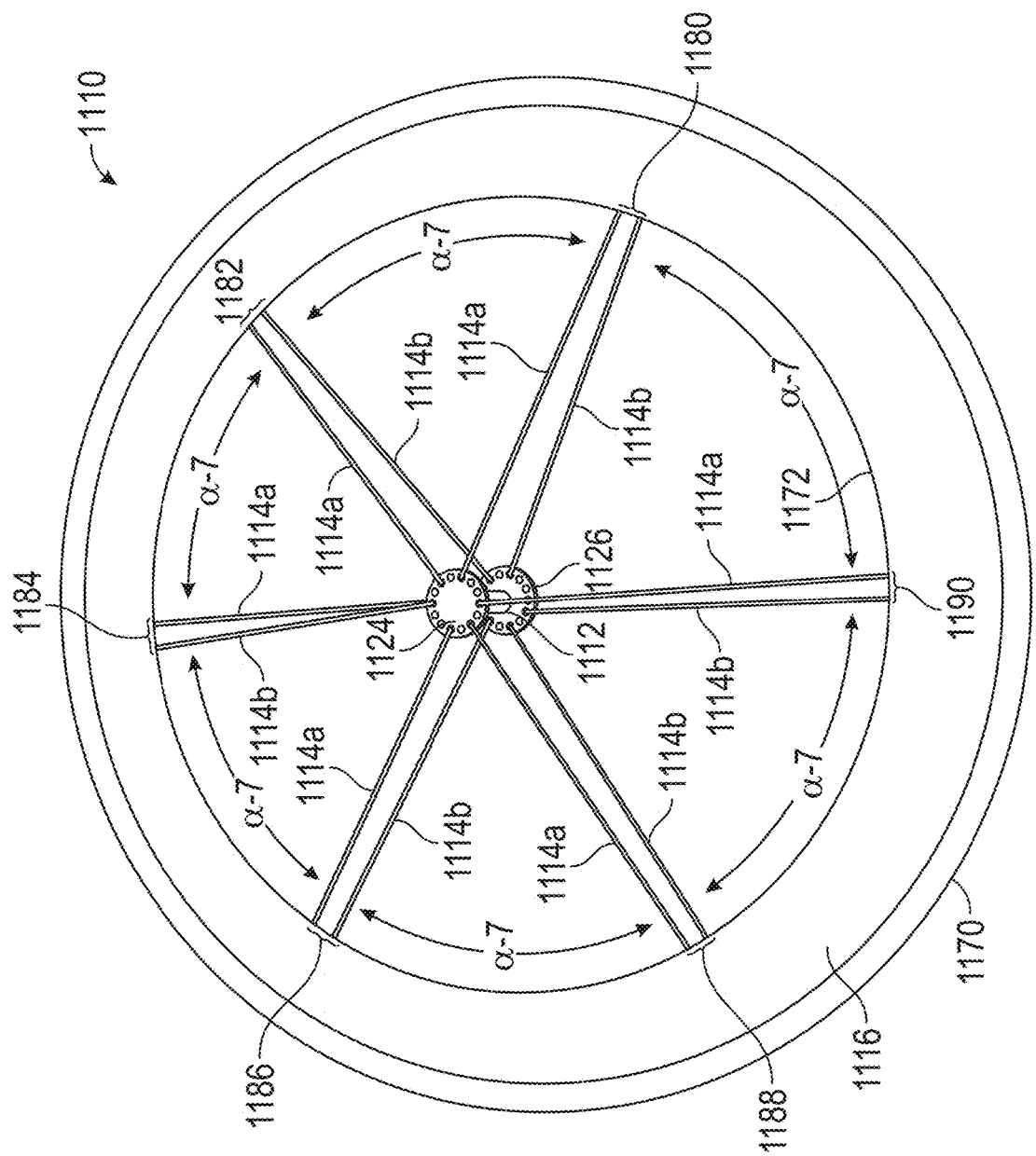
FIG. 17 is a perspective view of another embodiment of a bicycle wheel incorporating a novel hub and spoke arrangement having a total of twelve spokes arranged in a non-contact orientation.

Referring now to FIG. 17, another non-limiting embodiment of a bicycle wheel 1110 is illustrated. The bicycle wheel 1110 includes a hub 1112 extending from a first flange 1124 to a second flange 1126. In the illustrated embodiment, the hub 1112, first flange 1124 and second flange 1126 are the same as, or similar to, the hub 12, first flange 24 and second flange 26 shown in FIG. 2 and described above. It should be appreciated that in other embodiments, the hub 1112, first flange 1124 and second flange 1126 can be different from the hub 12, first flange 24 and second flange 26, sufficient for the functions described herein.

Referring again to FIG. 17, the bicycle wheel 1110 also includes a plurality of spokes 1114*a*, 1114*b* extending from the first and second flanges 1124, 1126 to an outer rim 1116. In the illustrated embodiment, each of the plurality of spokes 1114*a*, 1114*b* is the same as, or similar to, the spoke 14 shown in FIGS. 3A, 3B and described above. It should be appreciated that in other embodiments, each of the spokes 1114*a*, 1114*b* can be different from the spoke 14, sufficient for the functions described herein.

Referring again to FIG. 17, a tire 1170 is connected to the outer rim 1116. The tire 1170 can have any desired shape, size, and configuration sufficient for the functions described herein.

Referring again to FIG. 17, the plurality of spokes 1114*a*, 1114*b* form a spoke count. In the illustrated embodiment, the spoke count provides a quantity of twelve (12) spokes, arranged in groupings. This spoke arrangement can be described as the first spoke 1114*a* extends from the first flange 1124 through an inner portion 1172 of the rim 1116 and a corresponding second spoke 1114*b* extends from the second flange 1126 through the inner portion 1172 of the rim 1116 proximate the first spoke 1114*a*, thereby forming a first grouping 1180 of spokes. In a similar manner, a second, third, fourth, fifth and sixth grouping of spokes 1182, 1184, 1186, 1188, 1190 are formed.

Referring again to the embodiment shown in FIG. 17, each of the groupings 1180, 1182, 1184, 1186, 1188, 1190 of spokes form a centerline (not shown for purposes of clarity). The centerlines are spaced apart by an angle α-7. The angle α-7 is configured to facilitate structural support of the rim 1116 and tire 1170. In the illustrated embodiment, the angle α-7 is 60°.

Referring again to the embodiment shown in FIG. 17, it should be appreciated that in each of the groupings 1180, 1182, 1184. 1186, 1188, 1190 of the spokes, the spoke 1114*a* and the spoke 1114*b* have no contact with each other as each of the spokes extends from the first and second flanges 1124, 1126 to the rim 1116.

Referring again to FIG. 17, each of the plurality of spokes 1114*a*, 1114*b* attaches to either of the first and second flanges 1124, 1126 as shown in FIGS. 7-10 and described above. That is, each of the spokes 1114*a*, 1114*b* can have a "head-in" or a "head-out" arrangement.

While the embodiment shown in FIG. 17 has a quantity of twelve (12) spokes arranged as shown, it should be appreciated that in other embodiments having a quantity of twelve (12) spokes, the spokes can be arranged in other orientations.

Figure 18:
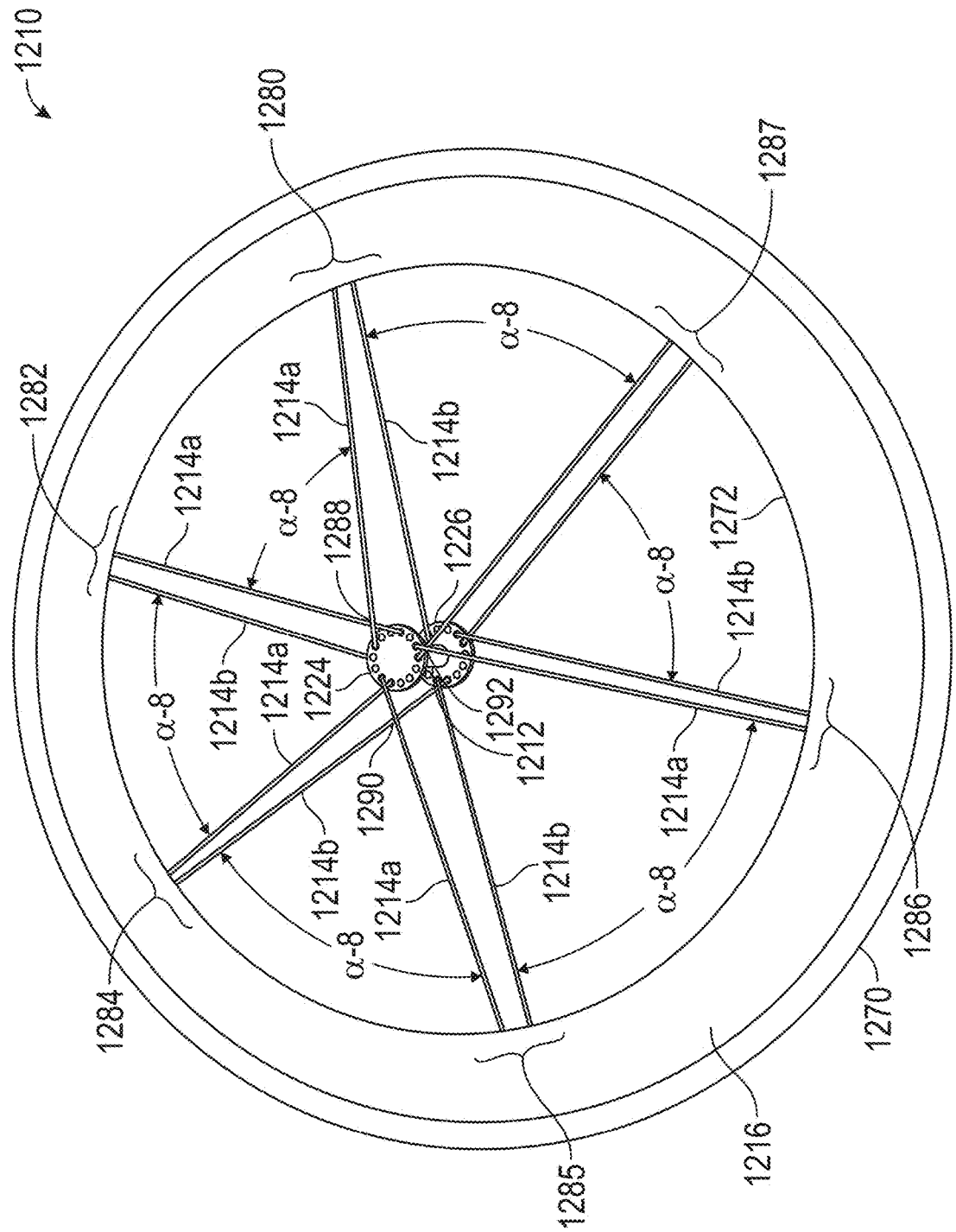
FIG. 18 is a perspective view of another embodiment of a bicycle wheel incorporating a novel hub and spoke arrangement having a total of twelve spokes arranged to form intersections.

Referring now to FIG. 18, another non-limiting embodiment of a bicycle wheel 1210 is illustrated. The bicycle wheel 1210 includes a hub 1212 extending from a first flange 1224 to a second flange 1226. In the illustrated embodiment, the hub 1212, first flange 1224 and second flange 1226 are the same as, or similar to, the hub 12, first flange 24 and second flange 26 shown in FIG. 2 and described above. It should be appreciated that in other embodiments, the hub 1212, first flange 1224 and second flange 1226 can be different from the hub 12, first flange 24 and second flange 26, sufficient for the functions described herein.

Referring again to FIG. 18, the bicycle wheel 1210 also includes a plurality of spokes 1214*a*, 1214*b* extending from the first and second flanges 1224, 1226 to an outer rim 1216. In the illustrated embodiment, each of the plurality of spokes 1214*a*, 1214*b* is the same as, or similar to, the spoke 14 shown in FIGS. 3A, 3B and described above. It should be appreciated that in other embodiments, each of the spokes 1214*a*, 1214*b* can be different from the spoke 14, sufficient for the functions described herein.

Referring again to FIG. 18, a tire 1270 is connected to the outer rim 1216. The tire 1270 can have any desired shape, size, and configuration sufficient for the functions described herein.

Referring again to FIG. 18, the plurality of spokes 1214*a*, 1214*b* form a spoke count. In the illustrated embodiment, the spoke count provides a quantity of twelve (12) spokes, arranged in groupings. This spoke arrangement can be described as the first spoke 1214*a* extends from the first flange 1224 through an inner portion 1272 of the rim 1216. A corresponding first spoke 1214*a* crosses the first spoke 1214*a* and forms a first intersection 1288. The first intersection 1288 forms a point of contact between the adjacent spokes 1214*a*. In a similar manner, a second and third intersections 1290, 1292 are formed by adjacent first spokes 1214*a*, which forms point of contacts between the adjacent spokes 1214*a*. In similar manners, it should be appreciated that fourth, fifth and sixth intersections (not shown in FIG. 18 for purposes of clarity) are formed by adjacent second spokes 1214*b*. The intersections form a "cross-laced" spoke arrangement as is known in the art.

Referring again to FIG. 18, the corresponding spokes 1214*a*, 714*b* form groupings 1280, 1282, 1284, 1285, 1286, 1287 of spokes.

Referring again to the embodiment shown in FIG. 18, each of the groupings 1280, 1282, 1284, 1285, 1286, 1287 of spokes forms a centerline (not shown for purposes of clarity). The centerlines are spaced apart by an angle α-8.

The angle α-8 is configured to facilitate structural support of the rim 1216 and tire 1270. In the illustrated embodiment, the angle α-8 is 60°.

Referring again to FIG. 18, each of the plurality of spokes 1214a, 1214b attaches to either of the first and second flanges 1224, 1226 as shown in FIGS. 7-10 and described above. That is, each of the spokes 1214a, 1214b can have a "head-in" or a "head-out" arrangement.

While the embodiment shown in FIG. 18 has a quantity of twelve (12) spokes arranged as shown, it should be appreciated that in other embodiments having a quantity of twelve (12) spokes, the spokes can be arranged in other orientations.

Figure 19:
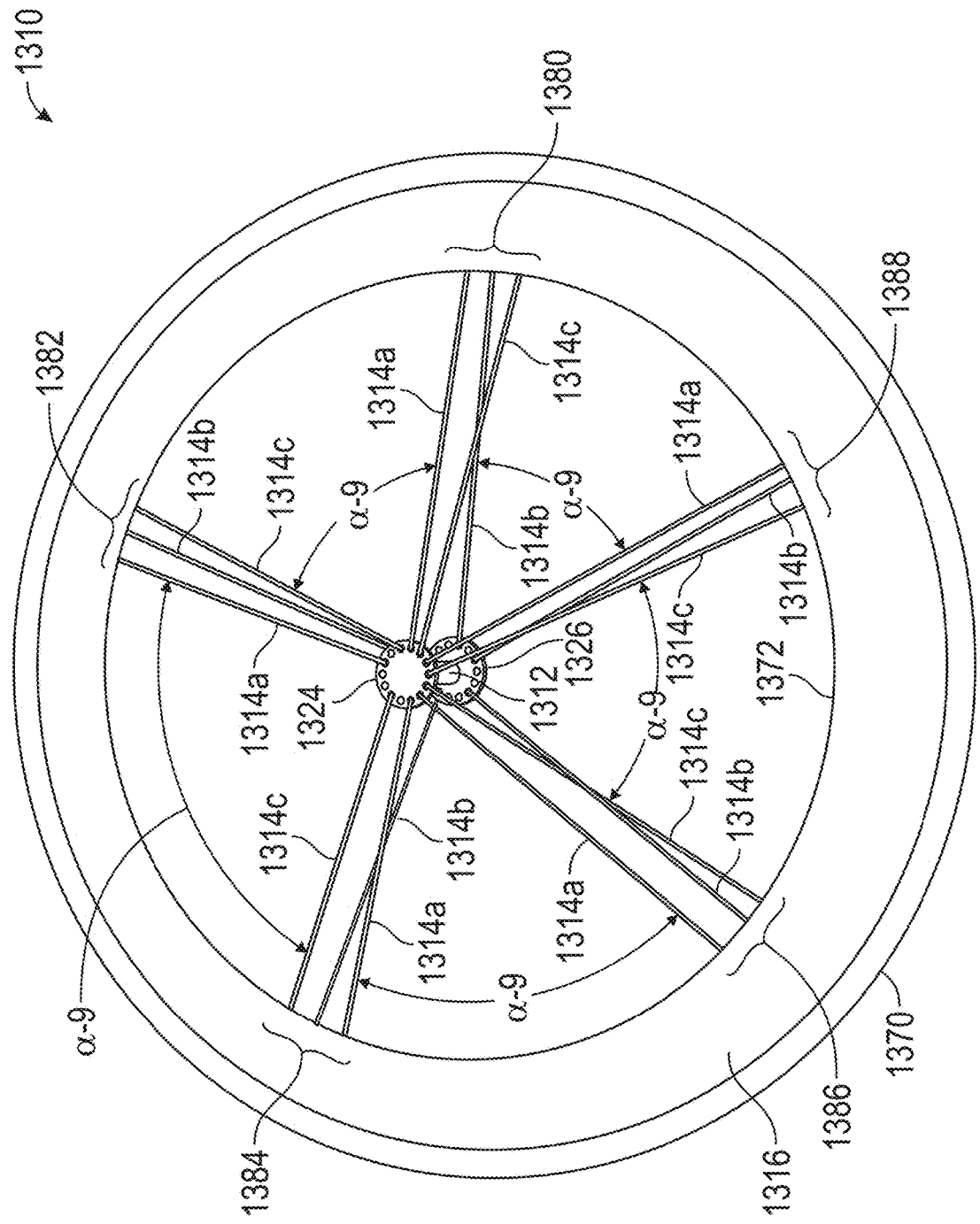
FIG. 19 is a perspective view of another embodiment of a bicycle wheel incorporating a novel hub and spoke arrangement having a total of fifteen spokes arranged in a non-contact orientation.

Referring now to FIG. 19, another non-limiting embodiment of a bicycle wheel 1310 is illustrated. The bicycle wheel 1310 includes a hub 1312 extending from a first flange 1324 to a second flange 1326. In the illustrated embodiment, the hub 1312, first flange 1324 and second flange 1326 are the same as, or similar to, the hub 12, first flange 24 and second flange 26 shown in FIG. 2 and described above. It should be appreciated that in other embodiments, the hub 1312, first flange 1324 and second flange 1326 can be different from the hub 12, first flange 24 and second flange 26, sufficient for the functions described herein.

Referring again to FIG. 19, the bicycle wheel 1310 also includes a plurality of spokes 1314a, 1314b, 1314c extending from the first and second flanges 1324, 1326 to an outer rim 1316. In the illustrated embodiment, each of the plurality of spokes 1314a, 1314b, 1314c is the same as, or similar to, the spoke 14 shown in FIGS. 3A, 3B and described above. It should be appreciated that in other embodiments, each of the spokes 1314a, 1314b, 1314c can be different from the spoke 14, sufficient for the functions described herein.

Referring again to FIG. 19, a tire 1370 is connected to the outer rim 1316. The tire 1370 can have any desired shape, size, and configuration sufficient for the functions described herein.

Referring again to FIG. 19, the plurality of spokes 1314a, 1314b, 1314c form a spoke count. In the illustrated embodiment, the spoke count provides a quantity of fifteen (15) spokes, arranged in triplicate groupings. This spoke arrangement can be described as the first spoke 1314a and the third spoke 1314c extend from the first flange 1324 through an inner portion 1372 of the rim 1316 and a corresponding second spoke 1314b extends from the second flange 1326 through an inner portion 1372 of the rim 1316 proximate the first and third spokes 1314a, 1314c thereby forming a first triplicate grouping 1380 of spokes. In a similar manner, a second, third, fourth and fifth triplicate groupings of spokes 1382, 1384, 1386, 1388 are formed.

Referring again to the embodiment shown in FIG. 19, each of the triplicate groupings 1380, 1382, 1384, 1386, 1388 of spokes forms a centerline (not shown for purposes of clarity). The centerlines are spaced apart by an angle α-9. The angle α-9 is configured to facilitate structural support of the rim 1316 and tire 1370. In the illustrated embodiment, the angle α-9 is 72°.

Referring again to the embodiment shown in FIG. 19, it should be appreciated that in each of the triplicate groupings 1380, 1382, 1384, 1386, 1388 of the spokes, the spokes 1314a, 1314b, 1314c have no contact with each other as each of the spokes extends from the first and second flanges 1324, 1326 to the rim 1316.

Referring again to FIG. 19, each of the plurality of spokes 1314a, 1314b, 1314c attaches to either of the first and second flanges 1324, 1326 as shown in FIGS. 7-10 and described above. That is, each of the spokes 1314a, 1314b, 1314c can have a "head-in" or a "head-out" arrangement.

While the embodiment shown in FIG. 19 has a quantity of fifteen (15) spokes arranged as shown, it should be appreciated that in other embodiments having a quantity of fifteen (15) spokes, the spokes can be arranged in other orientations including the non-limiting example of forming points of contact with spokes extending from the same flanges.

Figure 20:
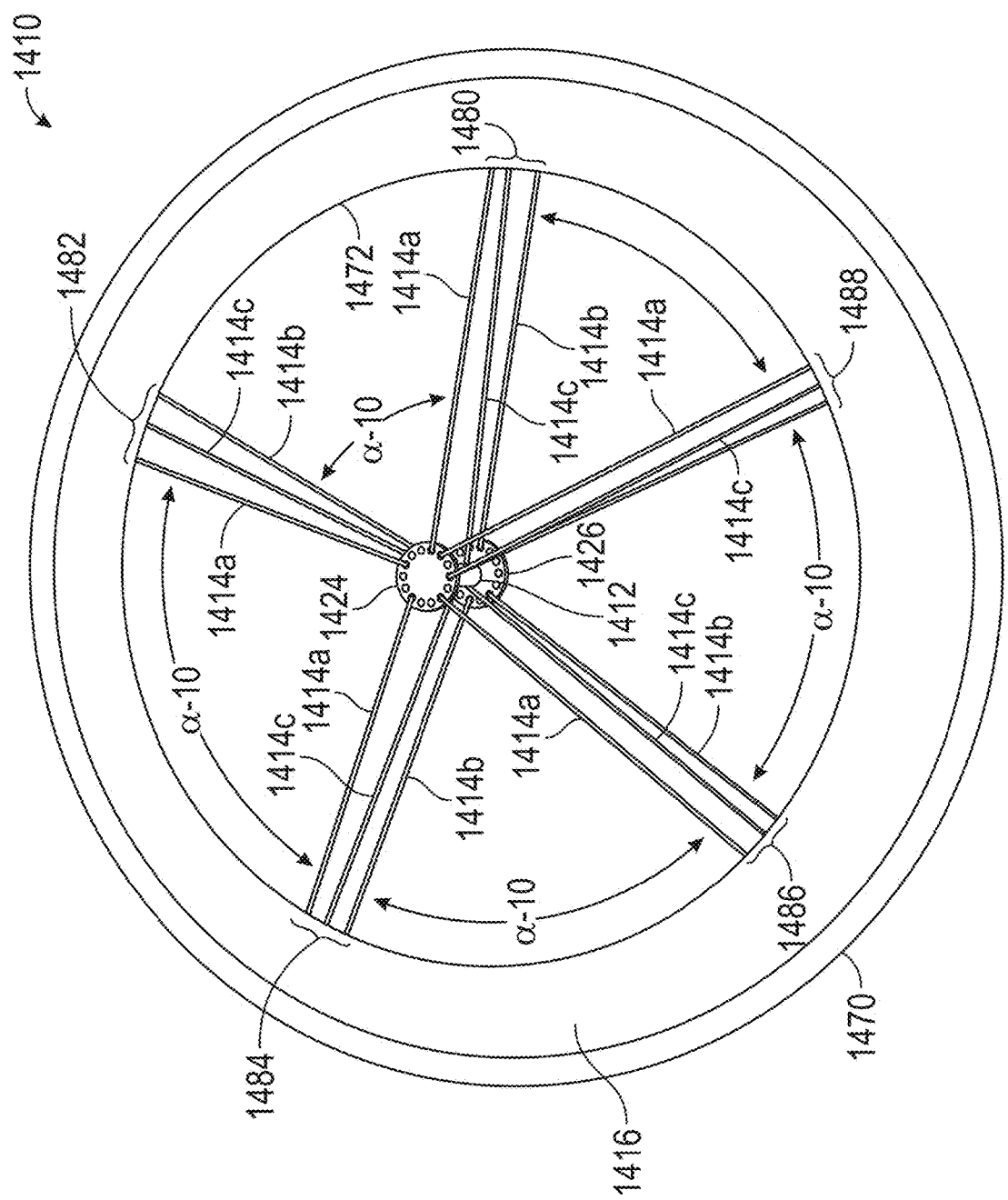
FIG. 20 is a perspective view of another embodiment of a bicycle wheel incorporating a novel hub and spoke arrangement having a total of fifteen spokes and also arranged in a non-contact orientation.

Referring now to FIG. 20, another non-limiting embodiment of a bicycle wheel 1410 is illustrated. The bicycle wheel 1410 includes a hub 1412 extending from a first flange 1424 to a second flange 1426. In the illustrated embodiment, the hub 1412, first flange 1424 and second flange 1426 are the same as, or similar to, the hub 12, first flange 24 and second flange 26 shown in FIG. 2 and described above. It should be appreciated that in other embodiments, the hub 1412, first flange 1424 and second flange 1426 can be different from the hub 12, first flange 24 and second flange 26, sufficient for the functions described herein.

Referring again to FIG. 20, the bicycle wheel 1410 also includes a plurality of spokes 1414a, 1414b, 1414c. In the illustrated embodiment, each of the plurality of spokes 1414a, 1414b, 1414c is the same as, or similar to, the spoke 14 shown in FIGS. 3A, 3B and described above. It should be appreciated that in other embodiments, each of the spokes 1414a, 1414b, 1414c can be different from the spoke 14, sufficient for the functions described herein.

Referring again to FIG. 20, a tire 1470 is connected to an outer rim 1416. The tire 1470 can have any desired shape, size, and configuration sufficient for the functions described herein.

Referring again to FIG. 20, the plurality of spokes 1414a, 1414b, 1414c form a spoke count. In the illustrated embodiment, the spoke count provides a quantity of fifteen (15) spokes, arranged in triplicate groupings. This spoke arrangement can be described as the first spoke 1414a extends from the first flange 1424 through an inner portion 1472 of the rim 1416. The second spoke 1414b extends from the second flange 1426 through the inner portion 1472 of the rim 1416. Finally, the third spoke 1414c extends from the hub 1412 through the inner portion 1472 of the rim 1416. The arrangement of the three spokes 1414a, 1414b and 1414c form a first triplicate grouping 1480 of spokes. In a similar manner, a second, third, fourth and fifth triplicate grouping of spokes 1482, 1484, 1486, 1488 of spokes are formed.

Referring again to the embodiment shown in FIG. 20, it should be appreciated that the spokes 1414c can be attached to the hub 1412 with various mechanisms, devices, and structures, including the non-limiting examples of another flange or internally arranged fasteners.

Referring again to the embodiment shown in FIG. 20, each of the triplicate groupings 1480, 1482, 1484, 1486, 1488 of spokes forms a centerline (not shown for purposes of clarity). The centerlines are spaced apart by an angle α-10. The angle α-10 is configured to facilitate structural support of the rim 1416 and tire 1470. In the illustrated embodiment, the angle α-10 is 72°.

Referring again to the embodiment shown in FIG. 20, it should be appreciated that in each of the triplicate groupings 1480, 1482, 1484, 1486, 1488 of the spokes, the spokes 1414a, 1414b, 1414c have no contact with each other as each of the spokes extends from the first and second flanges 1424, 1426 and the hub 1412 to the rim 1416.

Referring again to FIG. 20, each of the plurality of spokes 1414a, 1414b, attaches to either of the first and second flanges 1424, 1426 as shown in FIGS. 7-10 and described above. That is, each of the spokes 1414a, 1414b can have a "head-in" or a "head-out" arrangement.

While the embodiment shown in FIG. 20 has a quantity of fifteen (15) spokes arranged as shown, it should be appreciated that in other embodiments having a quantity of fifteen (15) spokes, the spokes can be arranged in other orientations.

Figure 21:
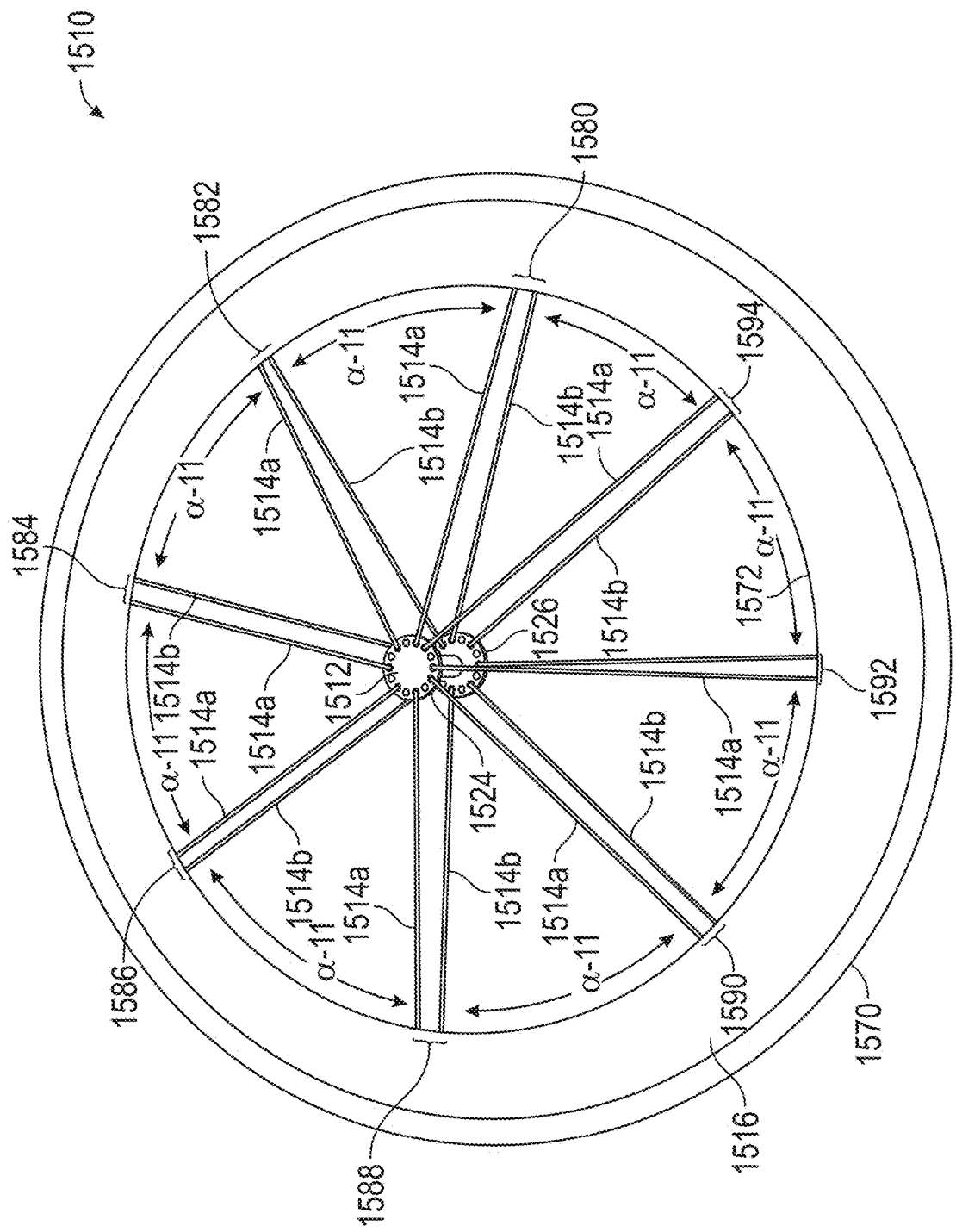
FIG. 21 is a perspective view of another embodiment of a bicycle wheel incorporating a novel hub and spoke arrangement having a total of sixteen spokes arranged in a non-contact orientation.

Referring now to FIG. 21, another non-limiting embodiment of a bicycle wheel 1510 is illustrated. The bicycle wheel 1510 includes a hub 1512 extending from a first flange 1524 to a second flange 1526. In the illustrated embodiment, the hub 1512, first flange 1524 and second flange 1526 are the same as, or similar to, the hub 12, first flange 24 and second flange 26 shown in FIG. 2 and described above. It should be appreciated that in other embodiments, the hub 1512, first flange 1524 and second flange 1526 can be different from the hub 12, first flange 24 and second flange 26, sufficient for the functions described herein.

Referring again to FIG. 21, the bicycle wheel 1510 also includes a plurality of spokes 1514a, 1514b extending from the first and second flanges 1524, 1526 to an outer rim 1516. In the illustrated embodiment, each of the plurality of spokes 1514a, 1514b is the same as, or similar to, the spoke 14 shown in FIGS. 3A, 3B and described above. It should be appreciated that in other embodiments, each of the spokes 1514a, 1514b can be different from the spoke 14, sufficient for the functions described herein.

Referring again to FIG. 21, a tire 1570 is connected to the outer rim 1516. The tire 1570 can have any desired shape, size, and configuration sufficient for the functions described herein.

Referring again to FIG. 21, the plurality of spokes 1514a, 1514b form a spoke count. In the illustrated embodiment, the spoke count provides a quantity of sixteen (16) spokes, arranged in groupings. This spoke arrangement can be described as the first spoke 1514a extends from the first flange 1524 through an inner portion 1572 of the rim 1516 and a corresponding second spoke 1514b extends from the second flange 1526 through the inner portion 1572 of the rim 1516 proximate the first spoke 1514a, thereby forming a first grouping 1580 of spokes. In a similar manner, a second, third, fourth, fifth, sixth, seventh and eighth grouping of spokes 1582, 1584, 1586, 1588, 1590, 1592, 1594 are formed.

Referring again to the embodiment shown in FIG. 21, each of the groupings 1580, 1282, 1584, 1586, 1588, 1590, 1592, 1594 of spokes forms a centerline (not shown for purposes of clarity). The centerlines are spaced apart by an angle α-11. The angle α-11 is configured to facilitate structural support of the rim 1516 and tire 1570. In the illustrated embodiment, the angle α-11 is 45°.

Referring again to the embodiment shown in FIG. 21, it should be appreciated that in each of the groupings 1580, 1582, 1584, 1586, 1588, 1590 of the spokes, the spoke 1514a and the spoke 1514b have no contact with each other as each of the spokes extends from the first and second flanges 1524, 1526 to the rim 1516.

Referring again to FIG. 21, each of the plurality of spokes 1514a, 1514b attaches to either of the first and second flanges 1524, 1526 as shown in FIGS. 7-10 and described above. That is, each of the spokes 1514a, 1514b can have a "head-in" or a "head-out" arrangement.

While the embodiment shown in FIG. 21 has a quantity of sixteen (16) spokes arranged as shown, it should be appreciated that in other embodiments having a quantity of sixteen (16) spokes, the spokes can be arranged in other orientations.

Figure 22:
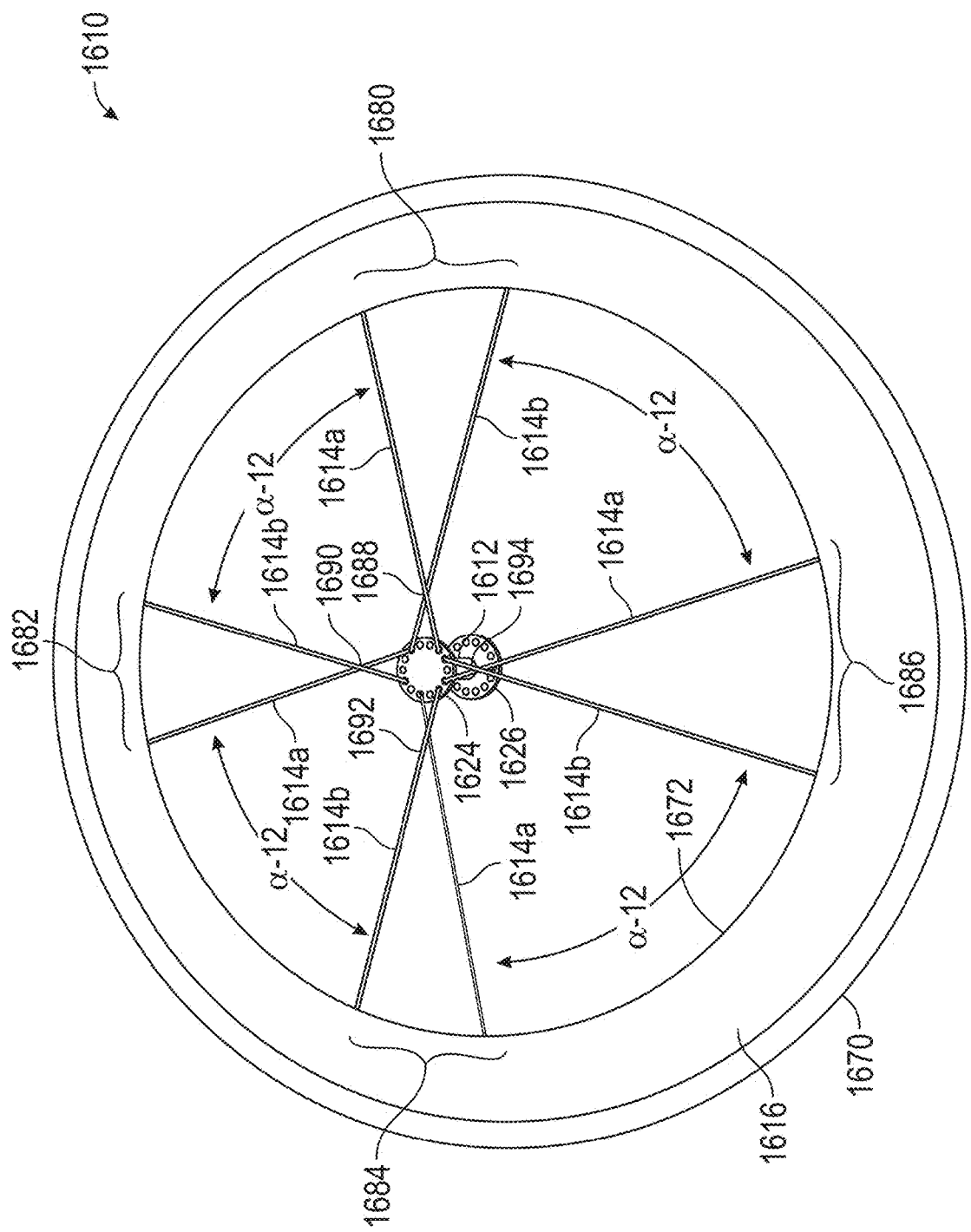
FIG. 22 is a perspective view of another embodiment of a bicycle wheel incorporating a novel hub and spoke arrangement having a total of sixteen spokes arranged to form intersections.

Referring now to FIG. 22, another non-limiting embodiment of a bicycle wheel 1610 is illustrated. The bicycle wheel 1610 includes a hub 1612 extending from a first flange 1624 to a second flange 1626. In the illustrated embodiment, the hub 1612, first flange 1624 and second flange 1626 are the same as, or similar to, the hub 12, first flange 24 and second flange 26 shown in FIG. 2 and described above. It should be appreciated that in other embodiments, the hub 1612, first flange 1624 and second flange 1626 can be different from the hub 12, first flange 24 and second flange 26, sufficient for the functions described herein.

Referring again to FIG. 22, the bicycle wheel 1610 also includes a plurality of spokes 1614a, 1614b extending from the first and second flanges 1624, 1626 to an outer rim 1616. In the illustrated embodiment, each of the plurality of spokes 1614a, 1614b is the same as, or similar to, the spoke 14 shown in FIGS. 3A, 3B and described above. It should be appreciated that in other embodiments, each of the spokes 1614a, 1614b can be different from the spoke 14, sufficient for the functions described herein.

Referring again to FIG. 22, a tire 1670 is connected to the outer rim 1616. The tire 1670 can have any desired shape, size, and configuration sufficient for the functions described herein.

Referring again to FIG. 22, the plurality of spokes 1614a, 1614b form a spoke count. In the illustrated embodiment, the spoke count provides a quantity of sixteen (16) spokes, arranged in groupings. This spoke arrangement can be described as the first spoke 1614a extends from the first flange 1624 through an inner portion 1672 of the rim 1616. A corresponding second spoke 1614b crosses the first spoke 1614a and forms a first intersection 1688. The first intersection 1688 forms a point of contact between the adjacent spokes 1614a, 1613b. In a similar manner, a second, third and fourth intersections 1690, 1692, 1694 are formed by the first spokes 1614a, and the second spokes 1614b. While not shown in FIG. 22 for purposes of clarity, in similar manners, it should be appreciated that fifth, sixth, seventh and eighth intersections are formed by adjacent spokes 1614a, 1614b extending from the second flange 1626. The intersections form a "cross-laced" spoke arrangement as is known in the art.

Referring again to FIG. 22, the corresponding spokes 1614a, 1614b extending from the first flange 1624 form groupings 1680, 1682, 1684, 1686 of spokes. While not shown in FIG. 22, the corresponding spokes 1614a, 1614b extending from the second flange 1626 also form groupings of spokes.

Referring again to the embodiment shown in FIG. 22, each of the groupings 1680, 1682, 1684, 1686 of spokes for centerlines (not shown for purposes of clarity). The centerlines are spaced apart by an angle α-12. The angle α-12 is configured to facilitate structural support of the rim 1616 and tire 1670. In the illustrated embodiment, the angle α-12 is 90°.

Referring again to FIG. 22, each of the plurality of spokes 1614a, 1614b attaches to either of the first and second flanges 1624, 1626 as shown in FIGS. 7-10 and described above. That is, each of the spokes 1614a, 1614b can have a "head-in" or a "head-out" arrangement.

While the embodiment shown in FIG. 22 has a quantity of sixteen (16) spokes arranged as shown, it should be appreciated that in other embodiments having a quantity of sixteen (16) spokes, the spokes can be arranged in other orientations.

Figure 23:
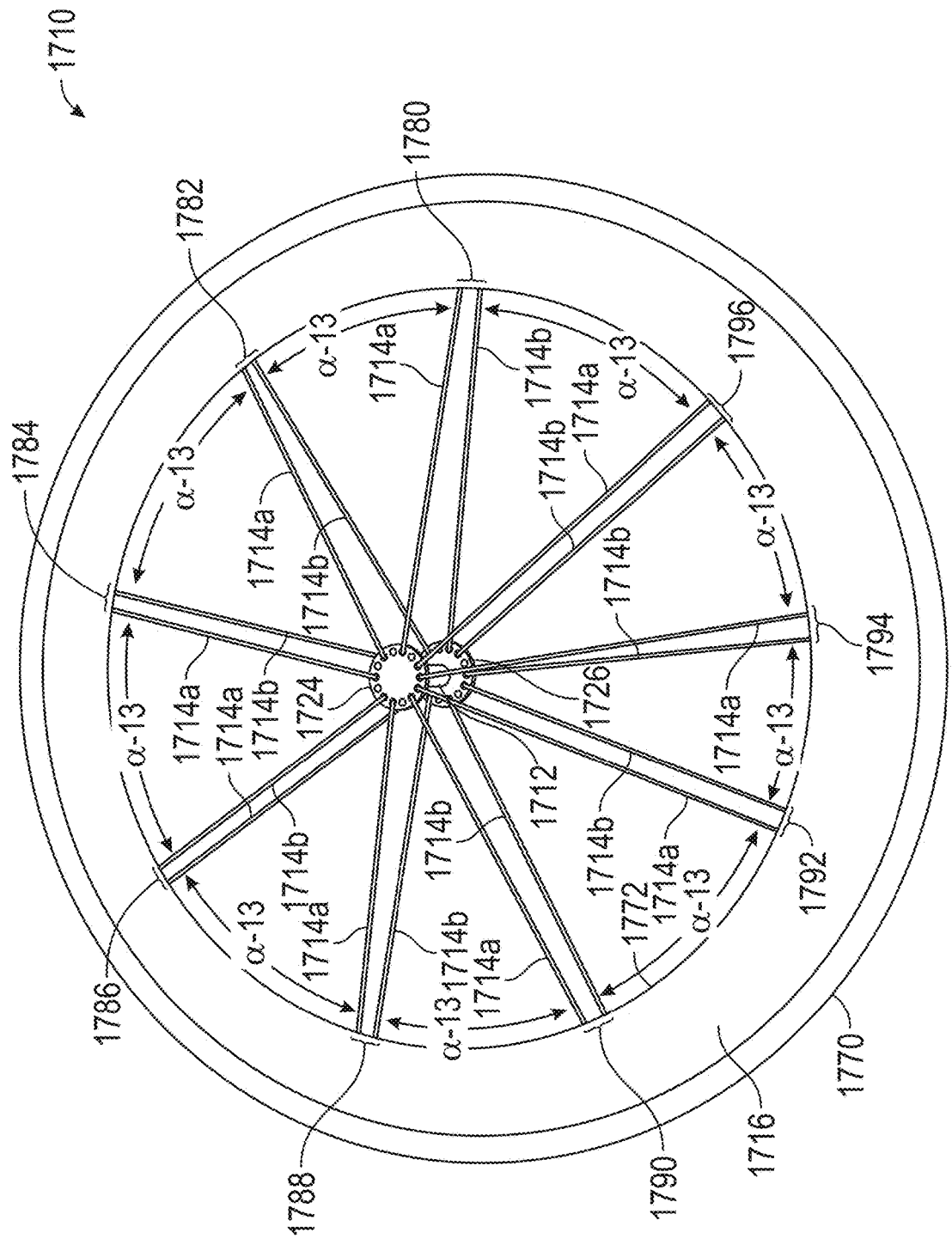
FIG. 23 is a perspective view of another embodiment of a bicycle wheel incorporating a novel hub and spoke arrangement having a total of eighteen spokes and arranged in a non-contact orientation.

Referring now to FIG. 23, another non-limiting embodiment of a bicycle wheel 1710 is illustrated. The bicycle wheel 1710 includes a hub 1712 extending from a first flange 1724 to a second flange 1726. In the illustrated embodiment, the hub 1712, first flange 1724 and second flange 1726 are the same as, or similar to, the hub 12, first flange 24 and second flange 26 shown in FIG. 2 and described above. It should be appreciated that in other embodiments, the hub 1712, first flange 1724 and second flange 1726 can be different from the hub 12, first flange 24 and second flange 26, sufficient for the functions described herein.

Referring again to FIG. 23, the bicycle wheel 1710 also includes a plurality of spokes 1714a, 1714b extending from the first and second flanges 1724, 1726 to an outer rim 1716. In the illustrated embodiment, each of the plurality of spokes 1714a, 1714b is the same as, or similar to, the spoke 14 shown in FIGS. 3A, 3B and described above. It should be appreciated that in other embodiments, each of the spokes 1714a, 1714b can be different from the spoke 14, sufficient for the functions described herein.

Referring again to FIG. 21, a tire 1770 is connected to the outer rim 1716. The tire 1770 can have any desired shape, size, and configuration sufficient for the functions described herein.

Referring again to FIG. 23, the plurality of spokes 1714a, 1714b form a spoke count. In the illustrated embodiment, the spoke count provides a quantity of eighteen (18) spokes, arranged in groupings. This spoke arrangement can be described as the first spoke 1714a extends from the first flange 1724 through an inner portion 1772 of the rim 1716 and a corresponding second spoke 1714b extends from the second flange 1726 through the inner portion 1772 of the rim 1716 proximate the first spoke 1714a, thereby forming a first grouping 1780 of spokes. In a similar manner, a second, third, fourth, fifth, sixth, seventh, eighth and ninth grouping of spokes 1782, 1784, 1786, 1788, 1790, 1792, 1794, 1796 are formed.

Referring again to the embodiment shown in FIG. 23, each of the groupings 1780, 1782, 1784, 1786, 1788, 1790, 1792, 1794, 1796 of spokes forms a centerline (not shown for purposes of clarity). The centerlines are spaced apart by an angle α-13. The angle α-13 is configured to facilitate structural support of the rim 1716 and tire 1770. In the illustrated embodiment, the angle α-13 is 40°.

Referring again to the embodiment shown in FIG. 23, it should be appreciated that in each of the groupings 1780, 1782, 1784, 1786, 1788, 1790, 1792, 1794, 1796 of the spokes, the spoke 1714a and the spoke 1714b have no contact with each other as each of the spokes extends from the first and second flanges 1724, 1726 to the rim 1716.

Referring again to FIG. 23, each of the plurality of spokes 1714a, 1714b attaches to either of the first and second flanges 1724, 1726 as shown in FIGS. 7-10 and described above. That is, each of the spokes 1714a, 1714b can have a "head-in" or a "head-out" arrangement.

While the embodiment shown in FIG. 23 has a quantity of eighteen (18) spokes arranged as shown, it should be appreciated that in other embodiments having a quantity of eighteen (18) spokes, the spokes can be arranged in other orientations.

Figure 24:
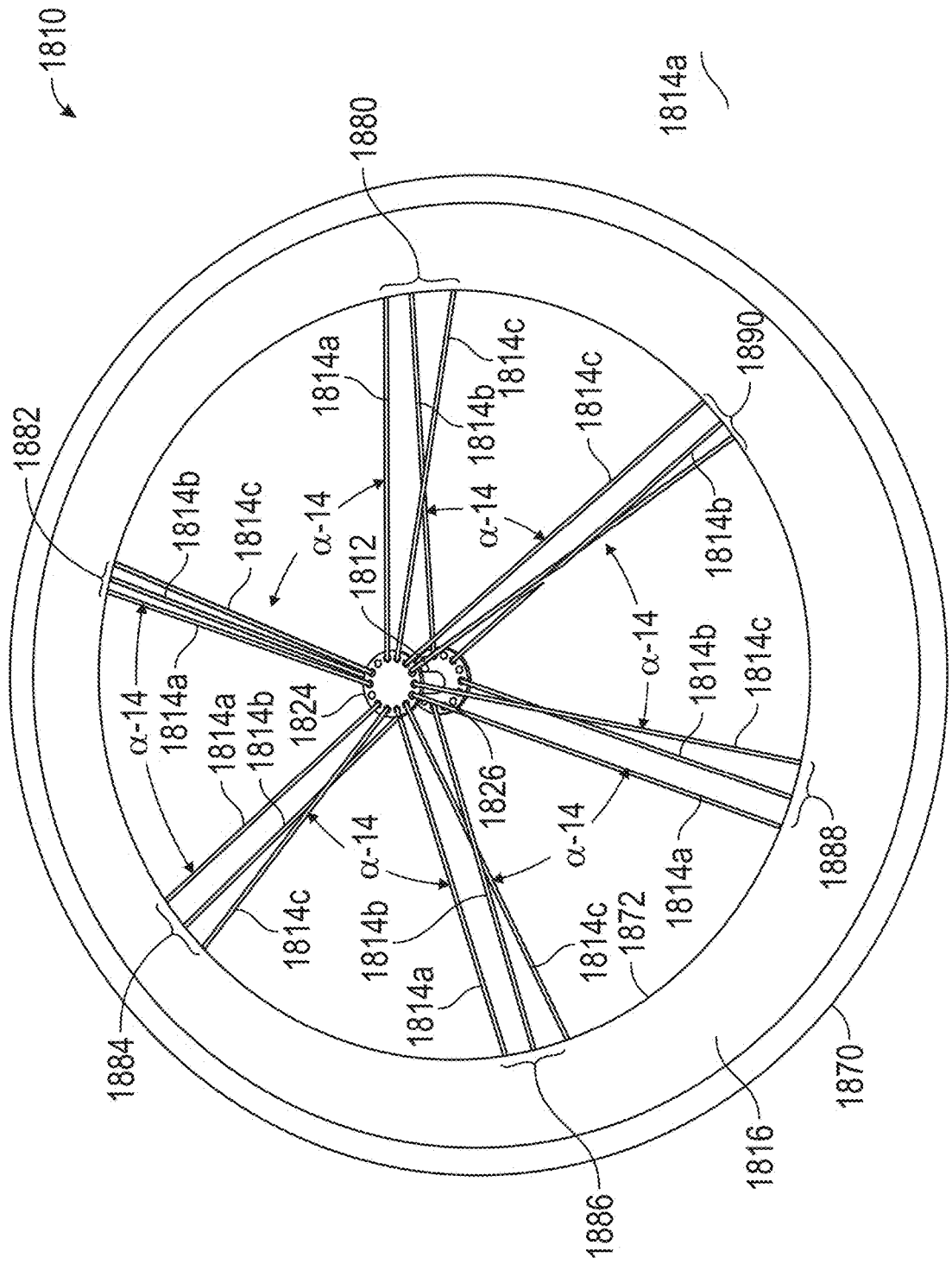
FIG. 24 is a perspective view of another embodiment of a bicycle wheel incorporating a novel hub and spoke arrangement having a total of eighteen spokes and also arranged in a non-contact orientation.

Referring now to FIG. 24, another non-limiting embodiment of a bicycle wheel 1810 is illustrated. The bicycle wheel 1810 includes a hub 1812 extending from a first flange 1824 to a second flange 1826. In the illustrated embodiment, the hub 1812, first flange 1824 and second flange 1826 are the same as, or similar to, the hub 12, first flange 24 and second flange 26 shown in FIG. 2 and described above. It should be appreciated that in other embodiments, the hub 1812, first flange 1824 and second flange 1826 can be different from the hub 12, first flange 24 and second flange 26, sufficient for the functions described herein.

Referring again to FIG. 24, the bicycle wheel 1810 also includes a plurality of spokes 1814a, 1814b, 1814c extending from the first and second flanges 1824, 1826 to an outer rim 1816. In the illustrated embodiment, each of the plurality of spokes 1814a, 1814b, 1814c is the same as, or similar to, the spoke 14 shown in FIGS. 3A, 3B and described above. It should be appreciated that in other embodiments, each of the spokes 1814a, 1814b, 1814c can be different from the spoke 14, sufficient for the functions described herein.

Referring again to FIG. 24, a tire 1870 is connected to the outer rim 1816. The tire 1870 can have any desired shape, size, and configuration sufficient for the functions described herein.

Referring again to FIG. 24, the plurality of spokes 1814a, 1814b, 1814c form a spoke count. In the illustrated embodiment, the spoke count provides a quantity of eighteen (18) spokes, arranged in triplicate groupings. This spoke arrangement can be described as the first spoke 1814a and the third spoke 1814c extend from the first flange 1824 through an inner portion 1872 of the rim 1816 and a corresponding second spoke 1814b extends from the second flange 1826 through an inner portion 1872 of the rim 1816 proximate the first and third spokes 1814a, 1814c thereby forming a first triplicate grouping 1880 of spokes. In a similar manner, a second, third, fourth, fifth and sixth triplicate groupings of spokes 1882, 1884, 1886, 1888 and 1890 are formed.

Referring again to the embodiment shown in FIG. 24, each of the triplicate groupings 1880, 1882, 1884, 1886, 1888, 1890 of spokes forms a centerline (not shown for purposes of clarity). The centerlines are spaced apart by an angle α-14. The angle α-14 is configured to facilitate structural support of the rim 1816 and tire 1870. In the illustrated embodiment, the angle α-14 is 60°.

Referring again to the embodiment shown in FIG. 24, it should be appreciated that in each of the triplicate groupings 1880, 1882, 1884, 1886, 1888, 1890 of the spokes, the spokes 1814a, 1814b, 1814c have no contact with each other as each of the spokes extends from the first and second flanges 1824, 1826 to the rim 1816.

Referring again to FIG. 24, each of the plurality of spokes 1814a, 1814b, 1814c attaches to either of the first and second flanges 1824, 1826 as shown in FIGS. 7-10 and described above. That is, each of the spokes 1814a, 1814b, 1814c can have a "head-in" or a "head-out" arrangement.

While the embodiment shown in FIG. 24 has a quantity of eighteen (18) spokes arranged as shown, it should be appreciated that in other embodiments having a quantity of eighteen (18) spokes, the spokes can be arranged in other orientations including the non-limiting example of forming points of contact with spokes extending from the same flanges.

Figure 25:
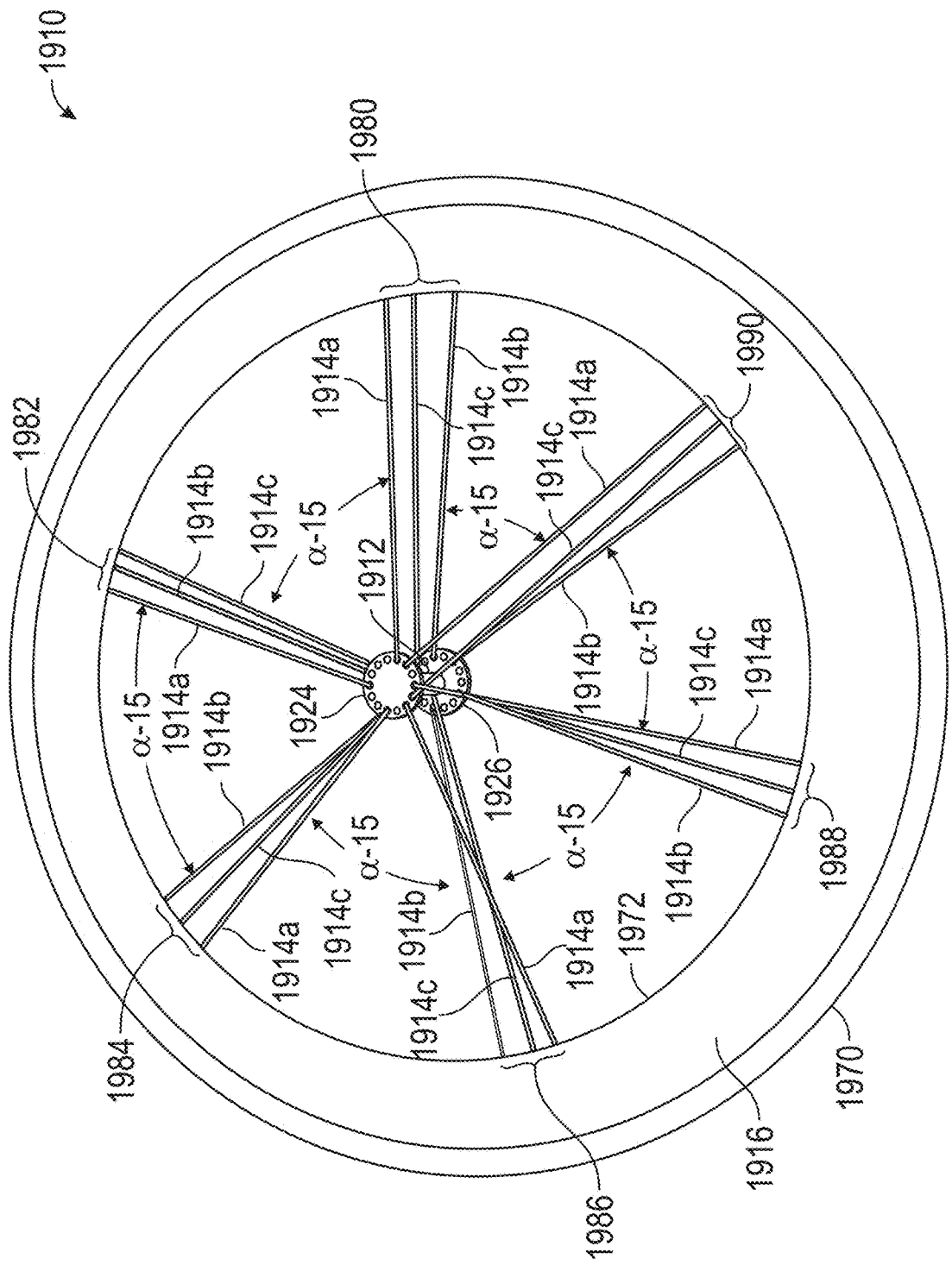
FIG. 25 is a perspective view of another embodiment of a bicycle wheel incorporating a novel hub and spoke arrangement having a total of eighteen spokes and also arranged in a non-contact orientation.

Referring now to FIG. 25, another non-limiting embodiment of a bicycle wheel 1910 is illustrated. The bicycle wheel 1910 includes a hub 1912 extending from a first flange 1924 to a second flange 1926. In the illustrated embodiment, the hub 1912, first flange 1924 and second flange 1926 are the same as, or similar to, the hub 12, first flange 24 and second flange 26 shown in FIG. 2 and described above. It should be appreciated that in other embodiments, the hub 1912, first flange 1924 and second flange 1926 can be different from the hub 12, first flange 24 and second flange 26, sufficient for the functions described herein.

Referring again to FIG. 25, the bicycle wheel 1910 also includes a plurality of spokes 1914a, 1914b, 1914c. In the illustrated embodiment, each of the plurality of spokes 1914a, 1914b, 1914c is the same as, or similar to, the spoke 14 shown in FIGS. 3A, 3B and described above. It should be appreciated that in other embodiments, each of the spokes 1914a, 1914b, 1914c can be different from the spoke 14, sufficient for the functions described herein.

Referring again to FIG. 25, a tire 1970 is connected to an outer rim 1916. The tire 1970 can have any desired shape, size, and configuration sufficient for the functions described herein.

Referring again to FIG. 25, the plurality of spokes 1914a, 1914b, 1914c form a spoke count. In the illustrated embodiment, the spoke count provides a quantity of eighteen (18) spokes, arranged in triplicate groupings. This spoke arrangement can be described as the first spoke 1914a extends from the first flange 1924 through an inner portion 1972 of the rim 1916. The second spoke 1914b extends from the second flange 1926 through the inner portion 1972 of the rim 1916. Finally, the third spoke 1914c extends from the hub 1912 through the inner portion 1972 of the rim 1916. The arrangement of the three spokes 1914a, 1914b and 1914c form a first triplicate grouping 1980 of spokes. In a similar manner, a second, third, fourth, fifth and sixth triplicate grouping of spokes 1982, 1984, 1986, 1988, 1990 of spokes are formed.

Referring again to the embodiment shown in FIG. 25, it should be appreciated that the spokes 1914c can be attached to the hub 1912 with various mechanisms, devices, and structures, including the non-limiting examples of another flange or internally arranged fasteners.

Referring again to the embodiment shown in FIG. 25, each of the triplicate groupings 1980, 1982, 1984, 1986, 1988, 1990 of spokes forms a centerline (not shown for purposes of clarity). The centerlines are spaced apart by an angle α-15. The angle α-15 is configured to facilitate structural support of the rim 1916 and tire 1970. In the illustrated embodiment, the angle α-15 is 60°.

Referring again to the embodiment shown in FIG. 25, it should be appreciated that in each of the triplicate groupings 1980, 1982, 1984, 1986, 1988, 1990 of the spokes, the spokes 1914a, 1914b, 1914c have no contact with each other as each of the spokes extends from the first and second flanges 1924, 1926 and the hub 1912 to the rim 1916.

Referring again to FIG. 25, each of the plurality of spokes 1914a, 1914b, attaches to either of the first and second flanges 1924, 1926 as shown in FIGS. 7-10 and described above. That is, each of the spokes 1914a, 1914b can have a "head-in" or a "head-out" arrangement.

While the embodiment shown in FIG. 25 has a quantity of eighteen (18) spokes arranged as shown, it should be appreciated that in other embodiments having a quantity of eighteen (18) spokes, the spokes can be arranged in other orientations.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially comparable results.

What is claimed is:

1. A novel bicycle hub and spoke arrangement comprising:
   a bicycle axle supported for rotation by a hub shaft, the bicycle axle configured to support a bicycle wheel for rotation;
   a plurality of flanges extending radially from the hub shaft, each of the plurality of flanges having a plurality of circumferentially arranged apertures;
   a plurality of spokes each having a first end, an opposing second end and a body extending therebetween, the first end of each of the plurality of spokes engaged with one of the circumferentially arranged apertures, the second end of each of the plurality of spokes connected to an outer rim, the outer rim configured to support a tire;
   wherein the first end of each of the plurality of spokes is connected to one of the plurality of circumferentially oriented apertures of the plurality of flanges in a manner such as to create three areas of contact between the first end of each of the plurality of spokes and the associated flange, the three areas of contact configured to strengthen a J bend area of the spoke and address spoke failure and shimmy;
   wherein a first area of contact is formed as a head of each of the spokes is seated within one of the plurality of circumferentially arranged apertures, a second area of contact is formed as an inner radius segment of each of the spokes contacts a wall defining the one of the plurality of flange apertures and a third area of contact is formed as each of the spokes contacts an outer rim of the flange;
   wherein the total quantity of spokes can be either six (6), eight (8), nine (9), ten (10), twelve (12), fifteen (15), sixteen (16) or eighteen (18).

2. The novel bicycle hub and spoke arrangement of claim 1, wherein the total quantity of spokes is six (6) and wherein each of the spokes is arranged to avoid contact with the other spokes.

3. The novel bicycle hub and spoke arrangement of claim 1, wherein the total quantity of spokes is eight (8) and wherein each of the spokes is arranged to avoid contact with the other spokes.

4. The novel bicycle hub and spoke arrangement of claim 1, wherein the total quantity of spokes is eight (8) and wherein each of the spokes is arranged to form a point of contact with a crossing spoke.

5. The novel bicycle hub and spoke arrangement of claim 1, wherein the total quantity of spokes is nine (9) and wherein the first end of at least one of the spokes connects to the hub shaft.

6. The novel bicycle hub and spoke arrangement of claim 1, wherein the total quantity of spokes is ten (10) and wherein each of the spokes is arranged to avoid contact with the other spokes.

7. The novel bicycle hub and spoke arrangement of claim 1, wherein the total quantity of spokes is twelve (12) and wherein each of the spokes is arranged to avoid contact with the other spokes.

8. The novel bicycle hub and spoke arrangement of claim 1, wherein the total quantity of spokes is twelve (12) and wherein each of the spokes is arranged to form a point of contact with a crossing spoke.

9. The novel bicycle hub and spoke arrangement of claim 1, wherein the total quantity of spokes is fifteen (15) and wherein each of the spokes is arranged to avoid contact with the other spokes.

10. The novel bicycle hub and spoke arrangement of claim 1, wherein the total quantity of spokes is fifteen (15) and wherein the first end of at least one of the spokes connects to the hub shaft.

11. The novel bicycle hub and spoke arrangement of claim 1, wherein the total quantity of spokes is sixteen (16) and wherein each of the spokes is arranged to avoid contact with the other spokes.

12. The novel bicycle hub and spoke arrangement of claim 1, wherein the total quantity of spokes is sixteen (16) and wherein each of the spokes is arranged to form a point of contact with a crossing spoke.

13. The novel bicycle hub and spoke arrangement of claim 1, wherein the total quantity of spokes is eighteen (18) and wherein each of the spokes is arranged to avoid contact with the other spokes.

14. The novel bicycle hub and spoke arrangement of claim 13, wherein the total quantity of spokes is eighteen (18) and wherein the spokes are arranged in groupings of two (2).

15. The novel bicycle hub and spoke arrangement of claim 13, wherein the total quantity of spokes is eighteen (18) and wherein the spokes are arranged in groupings of three (3).

16. The novel bicycle hub and spoke arrangement of claim 1, wherein the total quantity of spokes is eighteen (18) and wherein the first end of at least one of the spokes connects to the hub shaft.

17. The novel bicycle hub and spoke arrangement of claim 1, wherein the head of each of the plurality of spokes has a head-in arrangement.

18. The novel bicycle hub and spoke arrangement of claim 1, wherein the head of each of the plurality of spokes has a head-out arrangement.

* * * * *